US009451052B2

(12) United States Patent
Okada et al.

(10) Patent No.: US 9,451,052 B2
(45) Date of Patent: *Sep. 20, 2016

(54) INFORMATION DELIVERY SYSTEM FOR GENERATING A DATA STREAM WITH A SERVER SYSTEM BASED ON A CONTENT FILE RECEIVED FROM A CLIENT DEVICE

(71) Applicant: Tessera Advanced Technologies, Inc., San Jose, CA (US)

(72) Inventors: Hiroaki Okada, Tokyo (JP); Keigo Futagawa, Kanagawa (JP)

(73) Assignee: Tessera Advanced Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,905

(22) Filed: Sep. 5, 2014

(65) Prior Publication Data
US 2014/0379788 A1 Dec. 25, 2014

Related U.S. Application Data

(63) Continuation of application No. 13/371,116, filed on Feb. 10, 2012, now Pat. No. 8,856,217, which is a continuation of application No. 10/471,608, filed as application No. PCT/JP02/11754 on Nov. 12, 2002, now Pat. No. 8,150,906.

(30) Foreign Application Priority Data

Nov. 12, 2001 (JP) ................................. 2001-345623
Jun. 12, 2002 (JP) ................................. 2002-170758

(51) Int. Cl.
*H04L 29/06* (2006.01)
*H04N 7/173* (2011.01)
*H04N 21/2343* (2011.01)

(Continued)

(52) U.S. Cl.
CPC .............. *H04L 67/42* (2013.01); *H04N 7/173* (2013.01); *H04N 21/234309* (2013.01); *H04N 21/2547* (2013.01); *H04N 21/262* (2013.01); *H04N 21/47211* (2013.01); *H04N 21/8193* (2013.01);

(Continued)

(58) Field of Classification Search
None
See application file for complete search history.

(56) References Cited

U.S. PATENT DOCUMENTS 6,166,729 A 12/2000 Acosta et al.
6,381,029 B1 4/2002 Tipirneni (Continued)

FOREIGN PATENT DOCUMENTS

JP 10-164143 6/1998
JP 11-136394 5/1999

(Continued)

*Primary Examiner* — Sulaiman Nooristany
(74) *Attorney, Agent, or Firm* — Hickman Palermo Becker Bingham LLP; Malgorzata A. Kulczycka

(57) ABSTRACT

An information delivery system, an information delivery method, an information processing apparatus, and an information processing method is used advantageously to deliver content stream data easily, reliably and inexpensively to the general users. A personal computer prepares a content file and an order form file using software provided by a center system, and transmits the prepared files to the center system over the Internet. Given the order form file from a customer device, the center system encodes a content file accordingly to generate content stream data and causes a moving picture delivery server to deliver the generated stream data to user terminals. This invention can be applied, among others, to systems for delivering content data over the Internet.

20 Claims, 28 Drawing Sheets

(51) Int. Cl.
*H04N 21/2547* (2011.01)
*H04N 21/262* (2011.01)
*H04N 21/854* (2011.01)
*H04N 21/472* (2011.01)
*H04N 21/81* (2011.01)

(52) U.S. Cl.
CPC ...... *H04N 21/854* (2013.01); *H04N 21/85406* (2013.01)

(56) References Cited

U.S. PATENT DOCUMENTS

| | | |
|---|---|---|
| 6,578,199 B1 | 6/2003 | Tsou et al. |
| 6,742,043 B1 | 5/2004 | Moussa et al. |
| 6,748,421 B1 | 6/2004 | Ozkan et al. |
| 6,856,985 B1 | 2/2005 | Pierce et al. |
| 7,565,413 B1 * | 7/2009 | O'Toole, Jr. ............ H04L 67/02 709/219 |
| 2002/0016643 A1 | 2/2002 | Sakata |
| 2002/0056119 A1 * | 5/2002 | Moynihan ......... H04L 29/06027 725/87 |
| 2002/0056123 A1 | 5/2002 | Liwerant et al. |
| 2002/0095459 A1 | 7/2002 | Laux et al. |
| 2002/0154057 A1 * | 10/2002 | Ueda .................... F24F 11/0086 342/357.46 |
| 2002/0154157 A1 * | 10/2002 | Sherr et al. .................... 345/716 |
| 2003/0028890 A1 | 2/2003 | Swart et al. |
| 2005/0002525 A1 | 1/2005 | Alkove et al. |

FOREIGN PATENT DOCUMENTS

| | | |
|---|---|---|
| JP | 2000-78558 | 3/2000 |
| JP | 2001-218137 | 8/2001 |
| JP | 2001-265645 | 9/2001 |
| JP | 2002-140543 | 5/2002 |

\* cited by examiner

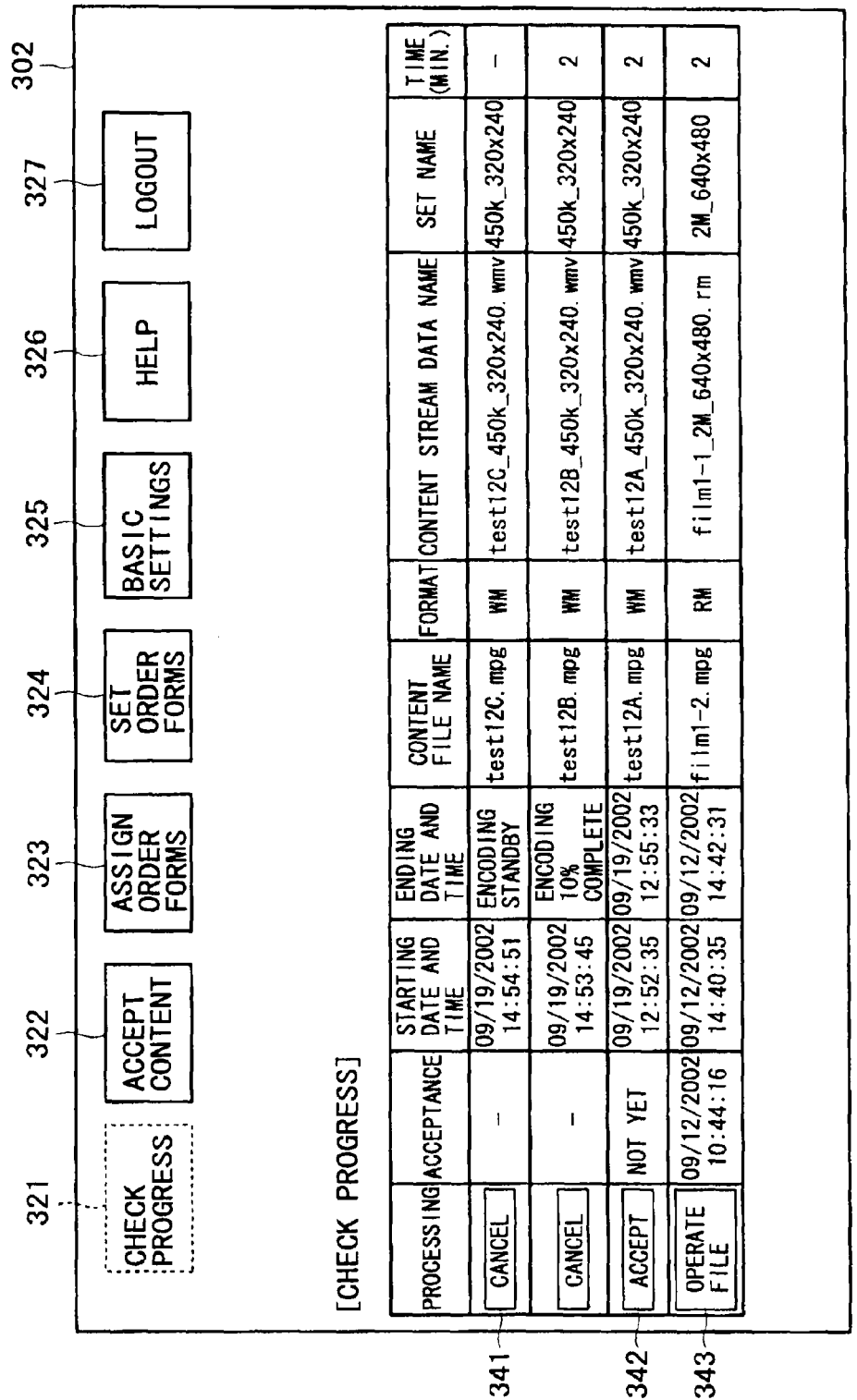

FIG. 16

| CHECK PROGRESS | ACCEPT CONTENT | ASSIGN ORDER FORMS | SET ORDER FORMS | BASIC SETTINGS | HELP | LOGOUT |

[ACCEPT CONTENT]

The service menu you ordered: The 10-hour Entry Pack at a ¥110,000 flat rate (i.e., fixed price for up to 10 hours), with ¥425 charged for every extra minutes.

Elapsed encoding time: 14 minutes
Remaining time at the flat rate: 586 minutes
Current charge: ¥110,000

| SE-LECTION | REPRODUCE FOR CHECK | STARTING DATE AND TIME | ENDING DATE AND TIME | CONTENT FILE NAME | FORMAT | CONTENT STREAM DATA NAME | SET NAME | TIME (MIN.) | SIZE (BYTES) |
|---|---|---|---|---|---|---|---|---|---|
| ☑ | REPRODUCE | 09/19/2002 12:52:35 | 09/19/2002 12:55:33 | test12A.mpg | WM | test12A_450k_320x240.wmv | 450k_320x240 | 2 | 6,414,287 |
| ☐ | REPRODUCE | 09/19/2002 10:50:35 | 09/19/2002 10:50:30 | test10.mpg | RM | test10_450k_320x240.rm | 450k_320x240 | 2 | 6,414,287 |
| ☑ | REPRODUCE | 09/19/2002 09:52:15 | 09/19/2002 09:55:13 | test09.mpg | WM | test09_450k_320x240.wmv | 450k_320x240 | 2 | 6,414,287 |

SELECT ALL    ACCEPT    DELETE

FIG. 17

[ACCEPT CONTENT]

The service menu you ordered: The 10-hour Entry Pack at a ¥110,000 flat rate (i.e., fixed price for up to 10 hours), with ¥425 charged for every extra minutes.

Elapsed encoding time: 14 minutes
Remaining time at the flat rate: 586 minutes
Current charge: ¥110,000

| SE-LECTION | REPRODUCE FOR CHECK | STARTING DATE AND TIME | ENDING DATE AND TIME | DATA NAME | SET NAME | TIME (MIN.) | SIZE (BYTES) |
|---|---|---|---|---|---|---|---|
| ☑ | REPRODUCE | 09/19/2002 12:52:35 | 09/19/2 12:55: | 20x240.wmv | 450k_320x240 | 2 | 6,414,287 |
| ☐ | REPRODUCE | 09/19/2002 10:50:35 | 09/19/2 10:50: | 0x240.rm | 450k_320x240 | 2 | 6,414,287 |
| ☑ | REPRODUCE | 09/19/2002 09:52:15 | 09/19/2 09:55: | 0x240.wmv | 450k_320x240 | 2 | 6,414,287 |

SELECT ALL

The data you selected are as follows:
Total time: 4 minutes
Additional charge: None Do you confirm and accept the selected data?

OK    CANCEL

CHECK PROGRESS | ACCEPT CONTENT | ASSIGN ORDER FORMS | SET ORDER FORMS | BASIC SETTINGS | HELP | LOGOUT

ACCEPT    DELETE

FIG. 18

[FILE OPERATION]

| SE-LECTION | ACCEPTANCE DATE AND TIME | STARTING DATE AND TIME | CONTENT FILE NAME | FORMAT | CONTENT STREAM DATA NAME | TIME (MIN.) | SIZE (BYTES) |
|---|---|---|---|---|---|---|---|
| ☑ | 09/19/2002 15:23:46 | 09/19/2002 14:54:51 | test12C.mpg | WM | test12C_450k_320x240.wmv | 2 | 6,414,287 |
| ☐ | 09/19/2002 15:03:12 | 09/19/2002 14:53:45 | test12B.mpg | WM | test12B_450k_320x240.wmv | 2 | 6,414,287 |

SELECT ALL —372    FTP UPLOAD —373

NOTE: Below is the FTP information set on the Basic Setting Screen. Modifying this information allows the upload destination for each format to be changed temporarily.

FTP INFORMATION

| FORMAT | HOST | ACCOUNT | PASSWORD | INITIAL FOLDER | PASV |
|---|---|---|---|---|---|
| WM | cds-ftp1 | rencw00a | ***** | | ☐ |
| RM | | | | | ☐ |
| QT | | | | | ☐ |
| PV | | | | | ☐ |
| EM | | | | | ☐ |

371 → (pointing to checkbox)

Buttons: CHECK PROGRESS | ACCEPT CONTENT | ASSIGN ORDER FORMS | SET ORDER FORMS | BASIC SETTINGS | HELP | LOGOUT

307

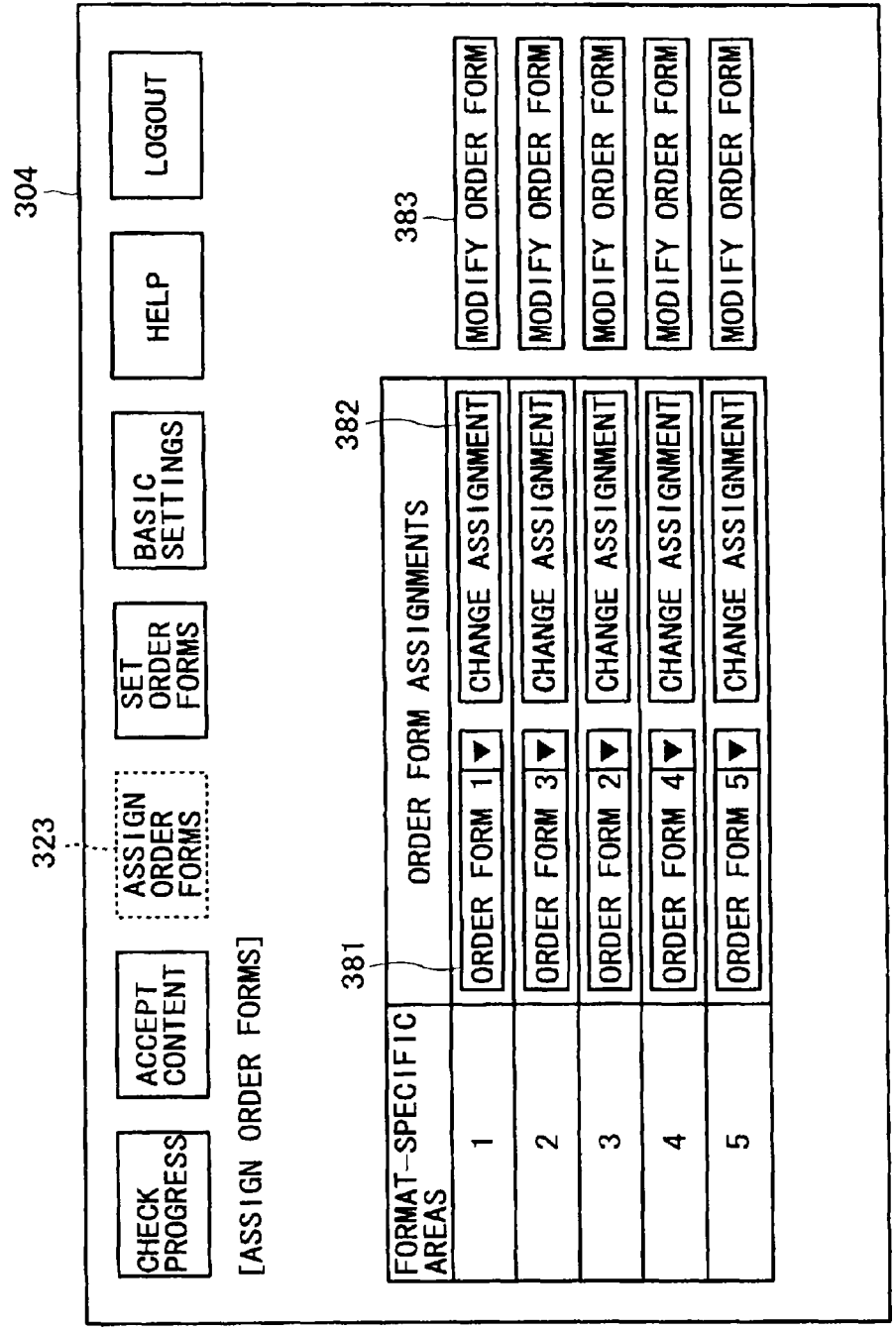

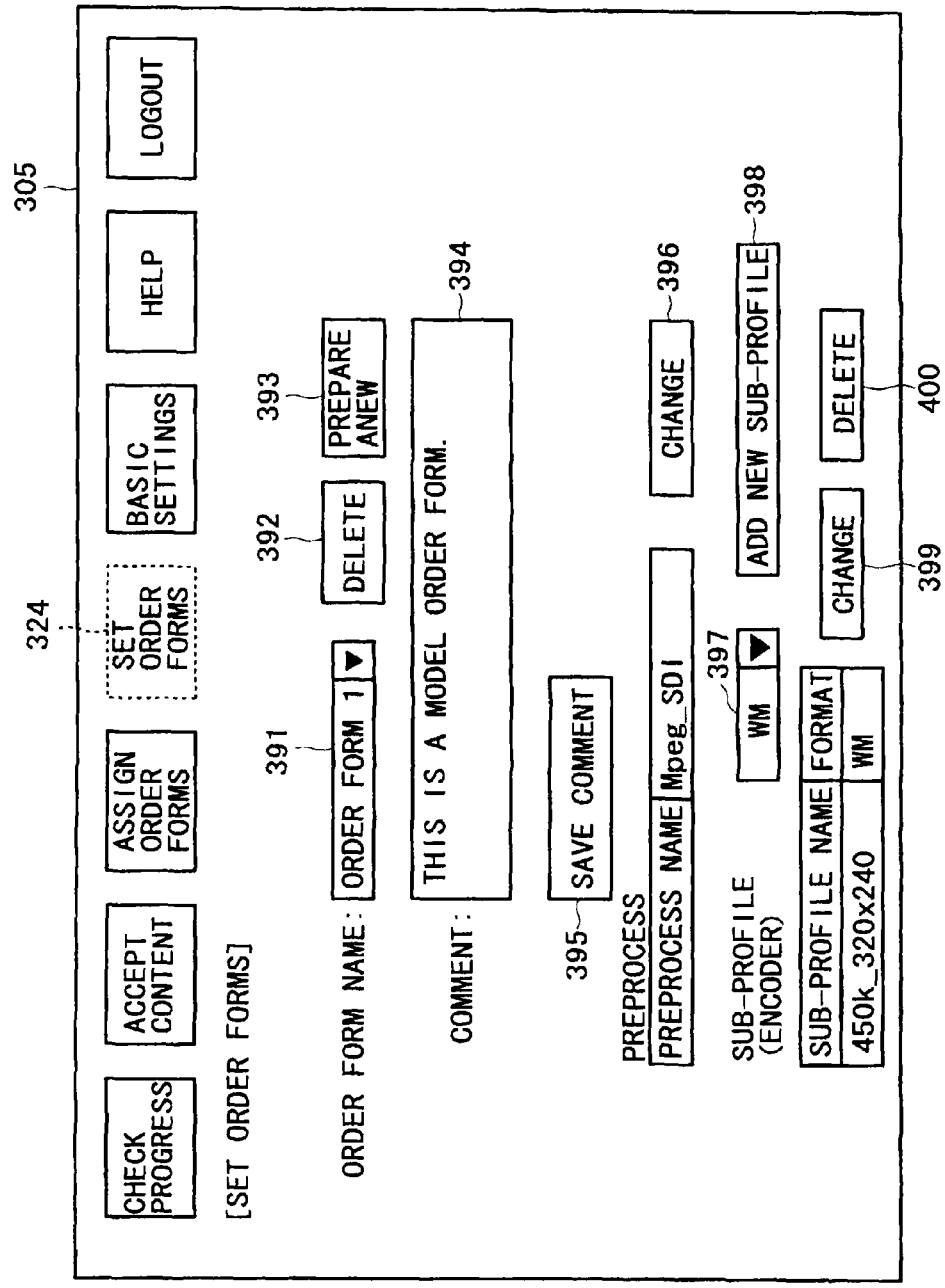

FIG. 21

[BASIC SETTINGS]

CHECK PROGRESS | ACCEPT CONTENT | ASSIGN ORDER FORMS | SET ORDER FORMS | BASIC SETTINGS | HELP | LOGOUT

CHANGE PASSWORD
- CURRENT PASSWORD — 421
- NEW PASSWORD — 422
- REENTER NEW PASSWORD — 423

MAIL ADDRESS FOR CONTACT
- CURRENT MAIL ADDRESS FOR CONTACT    sny123@net.sny.co.jp    CHANGE — 424
- NEW MAIL ADDRESS FOR CONTACT    — 425

FTP INFORMATION    CHANGE — 426

| FORMAT | HOST | ACCOUNT | PASSWORD | INITIAL FOLDER | PASV |
|---|---|---|---|---|---|
| WM | cds-ftp1 | rencw00a | ***** | | ☑ |
| RM | | | | | ☐ |
| QT | | | | | ☐ |
| PV | | | | | ☐ |
| EM | | | | | ☐ |

325 — BASIC SETTINGS
306

SET ENCODING DETAILS [PREPROCESS]

SUB-PROFILE NAME: [Mpeg_SD1]   RECOMMENDED SETTING: [Mpeg_SD1 ▼]   [IMPORT]

VIDEO

PROCESSING PRIORITY: [PICTURE QUALITY FIRST ▼]   FIELD PRIORITY: [Second On Top ▼]   SINGLE FIELD MODE: [Off ▼]

IN-POINT: [00:00:00.000] (hh:mm:ss.mmm)   OUT-POINT: [00:00:00.000] (hh:mm:ss.mmm)

FADE-IN: [0] SECONDS (TO 1 DECIMAL PLACE)   FADE-OUT: [0] SECONDS (TO 1 DECIMAL PLACE)

SMOOTHING

Blur: [0] (0.0-8.0)　　　　　　　Noise Reduction: [0] (0.0-4.0)
　Temporal Smoothing: [1 ▼] FRAMES　　　　　　Inverse Telecine: [Off ▼]
　　　　　Unsharp Mask: [Off ▼]　　　Unsharp Mask Intensity: [100] (0.0-1000.0)
　　　　　　　　　　　　　　　　　　　　　Unsharp Mask Radius: [0] (0.0-100.0)

CROP (SPECIFIED AS PIXEL COUNT OF SOURCE FILE)

FIG. 23

SET ENCODING DETAILS [Windows Media]

SUB-PROFILE NAME: [450k_320x240]   RECOMMENDED SETTING: [56k_160x120▼]   [IMPORT]

OUTPUT: AUDIO ☑ VIDEO ☑    WIDTH: [320] (80-720)   HEIGHT: [240] (60-576)

MULTI-BIT RATE: ☐   SEEKABLE: [YES▼]   ENCODE MODE: [CBR▼]   ENCODE PATH: [1▼]

VIDEO

CODEC [Windows Media Video V8▼]   MAXIMUM FRAME SPACING: [8] SECONDS (0-200)   QUALITY: [60] SECONDS (0-100)

(THE SMALLER THE VALUE,
THE SMOOTHER THE MOVEMENT.
THE LARGER THE VALUE,
THE SHARPER THE PICTURE.)

BIT RATE (10-5000)
[410]

MAXIMUM fps (4.0-30.0)
[24]

ACTIVE DELIVERY TARGET
☑ [xDSL¥Cable Modem▼]

AUDIO

AUDIO SETTING: [Windows Media Audio V2/V7/V8 32.048 kbps@22.050 kHz stereo▼]

SET ENCODING DETAILS[Real]

SUB-PROFILE NAME: [          ]  RECOMMENDED SETTING: [56k_160x120 ▼] [IMPORT]

OUTPUT: AUDIO ☑ VIDEO ☑   WIDTH: [320] (80-720)   HEIGHT: [240] (60-576)

SURE STREAM: [No ▼]   DOWNLOADABLE: [No ▼]   RECORDABLE: [No ▼]

MAXIMUM KEY FRAME SPACING: [8] SECONDS (1-200)   ENCODE MODE: [CBR ▼]   QUALITY: [NORMAL ▼]

VIDEO CODEC: [RealVideo 8 ▼]   AUDIO TYPE: [Music ▼]   ENCODE PATH: [2 ▼]

REGISTRABLE WITH SEARCH ENGINES: [No ▼]

SETTINGS REGARDING NETWORK CONGESTION

Loss Protection: [Yes ▼]   Prefer Audio Over Video: [Yes ▼]

STREAM

ACTIVE   DELIVERY TARGET   BIT RATE (10-5000)   MAXIMUM fps (4.0-30.0)   AUDIO SETTING ☑   [xDSL∕Cable Modem ▼]   [418]   [24]   [R8 32 kbps Stereo Music ▼]

SET ENCODING DETAILS [Quick Time]

SUB-PROFILE NAME: [    ]  RECOMMENDED SETTING: [56k_160×120 ▼]  [IMPORT]

OUTPUT: AUDIO [☑] VIDEO [☑]  WIDTH: [320] (80-720)  HEIGHT: [240] (60-576)

RECORDABLE: [ ]  RECORD AND REPRODUCE: [☑]  PROGRESSIVE DOWNLOAD: [ ]
CHECKING THIS ITEM DISABLES REPRODUCTION FOR ACCEPTANCE ON THE CONTACT ACCEPTANCE SCREEN.

VIDEO: CODEC: [Sorenson 3 Pro ▼]

DISPLAY WIDTH: [320] (80-720)  DISPLAY HEIGHT: [240] (60-576)
BIT RATE: [250] kbps (4-10000)  TARGET fps: [15] (1.0-30.0)  PROCESSING PRIORITY: [PICTURE QUALITY FIRST ▼]

IMAGE SMOOTHING: [ ]  BIDIRECTIONAL PREDICTION: [ ]

FORCE BLOCK REFRESH: [0] (0-50)

ENABLE MINIMUM QUALITY: [☑]  MINIMUM QUALITY: [12] (0-100)  FRAME DROPPING: [☑]

KEY FRAME-AUTOMATIC: [☑] MAXIMUM SPACING: [0] SECONDS (0-5000)  SENSITIVITY: [50] (0-100)

FIG. 26

SET ENCODING DETAILS [Packet Video]

SUB-PROFILE NAME: [____]   RECOMMENDED SETTING: [176x144_5fps_audio4kbps ▼]  [IMPORT]

[OUTPUT: AUDIO ☑ VIDEO ☑]

VIDEO
 WIDTH: [176] (80-480) HEIGHT: [144] (60-360)
 MAXIMUM fps: [5] (4.0-30.0) BIT RATE: [39] kbps (4-1000)
 MAXIMUM KEY FRAME SPACING: [10] SECONDS (0-20)

AUDIO
 BIT RATE: [12.2 ▼] kbps CHANNEL: [MONAURAL ▼]

[BACK] [SAVE]

SET ENCODING DATAILS[ezmovie]

SUB-PROFILE NAME: [_____]

RECOMMENDED SETTING: [e-mail_128×96▼]

VIDEO/AUDIO

AUDIO  [6.8kbps QCELP▼]
VIDEO
◉ SPECIFY PICTURE QUALITY  [24kbps▼]
○ SPECIFY FRAME RATE  MOVEMENT ○◉○ QUALITY
KEY FRAME SPACING  [10] [▼fps]
PICTURE SIZE  [None▼] SECONDS
MAXIMUM CONTENT LENGTH  [176×144 QCIF▼]
[30] SECONDS (1-30)

[BACK]  [SAVE]

[IMPORT]

```
SUB-PROFILE NAME: [i-motion_fps15]    RECOMMENDED SETTING: [128x64_Low▼] [IMPORT]
AUDIO
CODEC         [3 GPP AMR NARROWBAND FIXED BIT RATE▼]
ENCODE MOVE   [6.70 kbit/sec▼]
VIDEO
CODEC         [ISO MPEG-4 Video V1▼]
VIDEO SIZE  WIDTH:[128](32-176)  HEIGHT:[96](32-144)
FRAME RATE [15] fps (1-15)
DETAILED SETTINGS
BUFFER SETTINGS
SELECT VARIABLE COMPRESSION BUFFER SIZE FOR USE
BUFFER SIZE  ●DEFAULT
             ○SET BY USER    [3] SECONDS (0-30)
STREAM SETTINGS
KEY FRAME SPACING  [8] SECONDS (0-30)
PICTURE QUALITY    [0] (0-100)
                   (THE SMALLER THE VALUE, THE SMOOTHER THE MOVEMENT;
                    THE LARGER THE VALUE, THE SHARPER THE PICTURE.)
                         [BACK]    [SAVE]
```

308-7

INFORMATION DELIVERY SYSTEM FOR GENERATING A DATA STREAM WITH A SERVER SYSTEM BASED ON A CONTENT FILE RECEIVED FROM A CLIENT DEVICE

CROSS REFERENCE TO RELATED APPLICATIONS

This application is a continuation of U.S. application Ser. No. 13/371,116, filed on Feb. 10, 2012, which is a continuation of U.S. application Ser. No. 10/471,608, filed on Mar. 19, 2004, and is based upon and claims the benefit of priority to International Application No. PCT/JP02/11754, filed on Nov. 12, 2002 and from the prior Japanese Patent Application Nos. 2001-345623 filed on Nov. 12, 2001, and 2002-170758 filed on Jun. 12, 2002. The entire contents of each of these applications are incorporated herein by reference.

TECHNICAL FIELD

The present invention relates to an information delivery system, an information delivery method, an information processing apparatus, and an information processing method. More particularly, the invention relates to an information delivery system, an information delivery method, an information processing apparatus, and an information processing method for delivering information easily, reliably, and inexpensively.

BACKGROUND ART

With the Internet coming into widespread use today, some television stations deliver part of their TV programs on a streaming basis over the Internet in addition to their traditional broadcasts using terrestrial or satellite links.

Besides the TV stations, some content providers deliver their own contents (audio and visual) on the Internet in streaming fashion.

Where the content providers deliver streams of content data over the Internet, they are required to set up their own equipment manned by competent personnel for data format conversion. More specifically, AV (audio and visual) data picked up illustratively by on-site video cameras and AV data retrieved from such recording media as video tapes must be converted by suitable equipment into content stream data in a format ready for delivery over the Internet. Such stream data delivery formats have turned out to be a costly, labor-intensive affair.

DISCLOSURE OF INVENTION

The present invention has been made in view of the above circumstances and provides a system, an apparatus, and a method designed to offer content stream data to the general users easily, reliably, and inexpensively.

In carrying out the invention and according to one aspect thereof, there is provided an information delivery system wherein the center system provides the customer devices with software allowing each of the customer devices to perform necessary processing for transmitting the content data to the center system over the network; wherein, using the software provided by the center system, each of the customer devices compresses the content data using a predetermined format and transmits the compressed content data together with order information about an encoding format for the content data to the center system over the network; and wherein the center system including a plurality of encoding devices decompresses the compressed content data received from each of the customer devices, and causes one of the encoding devices which corresponds to the format designated by the order information in order to generate the content stream for delivery to the terminals over the network.

Each of the customer devices may preferably compress the content data using an MPEG2 format and describe the order information in XML.

The customer devices may preferably transmit the order information including delivery information about the delivery of the content stream to the center system over the network.

The delivery information may preferably include at least one of an information item designating a content delivery network, an information item designating an Internet service provider, an information item designating a connection type of any of the terminals, an information item designating a delivery period, an information item designating a delivery time, and an information item designating an allowable delivery count.

The center system may preferably transmit information necessary for generating the order information to the customer devices over the network.

The center system may preferably bill the customer after the customer has confirmed and accepted the content stream generated.

Each of the customer devices may preferably transmit to the center system over the network previously compressed content data together with the order information about the encoding format for the content data, and the center system may preferably convert the previously compressed content data coming from each of the customer devices using a predetermined format.

The center system may preferably notify the customer of information indicating a series of processes performed on the content data received from the customer device.

The center system preferably using an e-mail may notify the customer of information about a series of processes performed on the content data received from the customer device.

The center system preferably using a Web page may notify the customer of information about a series of processes performed on the content data received from the customer device.

The format designated by the order information may preferably include at least one of Windows Media format, Real Media format, Quick Time format, Packet Video format, i-motion format, and ez movie format.

According to another aspect of the invention, there is provided an information delivery method for use with an information delivery system. The information delivery method may include the steps of: enabling the center system to provide the customer devices with software allowing each of the customer devices to perform necessary processing for transmitting the content data to the center system over the network; allowing each of the customer devices using the software provided by the center system to compress the content data using a predetermined format and to transmit the compressed content data together with order information about an encoding format for the content data to the center system over the network; and permitting the center system including a plurality of encoding devices to decompress the compressed content data received from each of the customer devices and to cause one of the encoding devices which corresponds to the format designated by the order information in order to generate the content stream for delivery to the terminals over the network.

According to a further aspect of the invention, there is provided a first information processing apparatus. The first information processing apparatus may include a holding element for holding software after acquiring the software from the center system, the software being needed to perform processing for transmitting the content data to the center system over the network; an acquiring element for acquiring the content data; a compressing element for compressing the content data acquired by the acquiring element, by use of the software held by the holding element; a generating element for generating order information about encoding of the content data; and a requesting element for transmitting the compressed content data and the generated order information to the center system over the network, thereby requesting the center system to generate the content stream and to deliver the content stream to the terminals.

The compressing element may preferably compress the content data using an MPEG2 format, and the generating element may preferably generate the order information as a file described in XML.

The compressing element may preferably not compress the content data if the content data acquired by the acquiring element turn out to be previously compressed.

The generating element may preferably access the center system over the network in order to acquire information necessary for generating the order information.

The generating element may preferably generate the order information including delivery information about the delivery of the content stream.

The delivery information may preferably include at least one of an information item designating a content delivery network, an information item designating an Internet service provider, an information item designating a connection type of any of the terminals, an information item designating a delivery period, an information item designating a delivery time, and an information item designating an allowable delivery count.

According to an even further aspect of the invention, there is provided a first information processing method. The first information processing method may include the steps of: holding software after acquiring the software from the center system, the software being needed to perform processing for transmitting the content data to the center system over the network; acquiring the content data; compressing the content data acquired in the acquiring step, by use of the software held in the holding step; generating order information about encoding of the content data; and transmitting the compressed content data and the generated order information to the center system over the network, thereby requesting the center system to generate the content stream and to deliver the content stream to the terminals.

According to a still further aspect of the invention, there is provided a program for a first recording medium. The program may include the steps of: holding software after acquiring the software from the center system, the software being needed to perform processing for transmitting the content data to the center system over the network; acquiring the content data; compressing the content data acquired in the acquiring step, by use of the software held in the holding step; generating order information about encoding of the content data; and transmitting the compressed content data and the generated order information to the center system over the network, thereby requesting the center system to generate the content stream and to deliver the content stream to the terminals.

According to a yet further aspect of the invention, there is provided a first program for use with a computer to carry out the steps of: holding software after acquiring the software from the center system, the software being needed to perform processing for transmitting the content data to the center system over the network; acquiring the content data; compressing the content data acquired in the acquiring step, by use of the software held in the holding step; generating order information about encoding of the content data; and transmitting the compressed content data and the generated order information to the center system over the network, thereby requesting the center system to generate the content stream and to deliver the content stream to the terminals.

According to another aspect of the invention, there is provided a second information processing apparatus. The second information processing apparatus may include a providing element for providing the customer devices with software allowing each of the customer devices to perform necessary processing for transmitting the content data to the center system over the network; a receiving element for receiving the content data and order information about encoding of the content data from the customer devices over the network, the content data having been compressed using a predetermined format and transmitted by each of the customer devices using the software provided by the providing element; a decompressing element for decompressing the content data received in compressed form by the receiving element; an encoding element for generating the content stream by encoding the content data decompressed by the decompressing element, using a format designated by the order information received by the receiving element; and a delivering element for delivering the content stream generated by the encoding element to the terminals over the network.

The decompressing element may preferably decompress the compressed content data using an MPEG2 format, and the encoding element may preferably generate the content stream by encoding the decompressed content data in the format designated by the order information described in XML.

The second information processing apparatus of this invention may further include a converting element for converting the compressed content data received by the receiving element, using a predetermined format.

The providing element may preferably provide any of the customer devices gaining access over the network with information necessary for generating the order information.

The order information may preferably include delivery information about the delivery of the content stream, and the delivering element may preferably deliver the content stream encoded by the encoding element to the terminals over the network.

The delivery information may preferably include at least one of an information item designating a content delivery network, an information item designating an Internet service provider, an information item designating a connection type of any of the terminals, an information item designating a delivery period, an information item designating a delivery time, and an information item designating an allowable delivery count.

The second information processing apparatus of this invention may further include a notifying element for notifying the customer of information indicating a series of processes performed on the content data received from the customer device.

The notifying element preferably using an e-mail may notify the customer of information about a series of processes performed on the content data received from the customer device.

The notifying element preferably using a Web page may notify the customer of information about a series of processes performed on the content data received from the customer device.

The format designated by the order information may preferably include at least one of Windows Media format, Real Media format, Quick Time format, Packet Video format, i-motion format, and ez movie format.

The second information processing apparatus of this invention may further include a billing element for billing the customer after the customer has confirmed and accepted the content stream generated by the encoding element.

According to a further aspect of the invention, there is provided a second information processing method. The second information processing method may include the steps of: providing the customer devices with software allowing each of the customer devices to perform necessary processing for transmitting the content data to the information processing apparatus over the network; receiving the content data and order information about encoding of the content data from the customer devices over the network, the content data having been compressed using a predetermined format and transmitted by each of the customer devices using the software provided in the providing step; decompressing the content data received in compressed form in the receiving step; encoding the content data decompressed in the decompressing step using a format designated by the order information received in the receiving step, thereby generating the content stream; and delivering the content stream generated in the encoding step to the terminals over the network.

According to an even further aspect of the invention, there is provided a program for a second recording medium. The program may include the steps of: providing the customer devices with software allowing each of the customer devices to perform necessary processing for transmitting the content data to the information processing apparatus over the network; receiving the content data and order information about encoding of the content data from the customer devices over the network, the content data having been compressed using a predetermined format and transmitted by each of the customer devices using the software provided in the providing step; decompressing the content data received in compressed form in the receiving step; encoding the content data decompressed in the decompressing step using a format designated by the order information received in the receiving step, thereby generating the content stream; and delivering the content stream generated in the encoding step to the terminals over the network.

According to a still further aspect of the invention, there is provided a second program to carry out the steps of: providing the customer devices with software allowing each of the customer devices to perform necessary processing for transmitting the content data to the information processing apparatus over the network; receiving the content data and order information about encoding of the content data from the customer devices over the network, the content data having been compressed using a predetermined format and transmitted by each of the customer devices using the software provided in the providing step; decompressing the content data received in compressed form in the receiving step; encoding the content data decompressed in the decompressing step using a format designated by the order information received in the receiving step, thereby generating the content stream; and delivering the content stream generated in the encoding step to the terminals over the network.

Where the information delivery system and the information delivery method of this invention are in use, the center system initially provides the customer devices with suitable software. Using the software provided by the center system, each of the customer devices compresses content data based on a predetermined format and transmits the compressed content data to the center system over the network together with the order information about the format in which to encode the content data. In turn, the center system decompresses the compressed content data coming from each of the customer devices, generates a content data stream by encoding the decompressed content data in the format designated by the order information, and delivers the generated data stream to the terminals over the network.

Where the first information processing apparatus, the first information processing method, and the first program of this invention are in use, software necessary for transmitting content data to the center system over the network is first acquired from the center system. When content data are acquired, they are compressed by use of the acquired software. The compressed content data are transmitted to the center system over the network along with the order information about encoding of the content data, whereby the center system is requested to generate a content data stream and to deliver the generated content stream to the terminals.

Where the second information processing apparatus, the second information processing method, and the second program of this invention are in use, suitable software is first provided to the customer devices. Using the software thus provided, each of the customer devices compresses content data based on a predetermined format and transmits the compressed content data over the network together with the order information about encoding of the content data. When the compressed content data and the order information are received, the compressed content data are decompressed and encoded in the format designated by the received order information, whereby a content data stream is generated and delivered to the plurality of terminals over the network.

BRIEF DESCRIPTION OF DRAWINGS

FIG. 15 is a schematic view illustrating a typical display of a progress check screen included in FIG. 13;

FIG. 16 is a schematic view indicating a typical display of a content acceptance screen included in FIG. 13;

FIG. 17 is a schematic view exhibiting another typical display of the content acceptance screen in FIG. 13;

FIG. 18 is a schematic view presenting a typical display of a file operation screen included in FIG. 13;

FIG. 19 is a schematic view sketching a typical display of an order form assignment screen included in FIG. 13;

FIG. 20 is a schematic view picturing another typical display of the order form setting screen in FIG. 13;

FIG. 21 is a schematic view showing a typical display of a basic setting screen included in FIG. 13;

FIG. 22 is a schematic view depicting a typical display of an encoding detail setting screen included in FIG. 13;

FIG. 23 is a schematic view illustrating a typical display of another encoding detail setting screen included in FIG. 13;

FIG. 24 is a schematic view indicating a typical display of another encoding detail setting screen included in FIG. 13;

FIG. 25 is a schematic view presenting a typical display of another encoding detail setting screen included in FIG. 13;

FIG. 26 is a schematic view exhibiting a typical display of another encoding detail setting screen included in FIG. 13;

FIG. 27 is a schematic view sketching a typical display of another encoding detail setting screen included in FIG. 13; and FIG. 28 is a schematic view showing a typical display of another encoding detail setting screen included in FIG. 13.

BEST MODE FOR CARRYING OUT THE INVENTION

Figure 1:
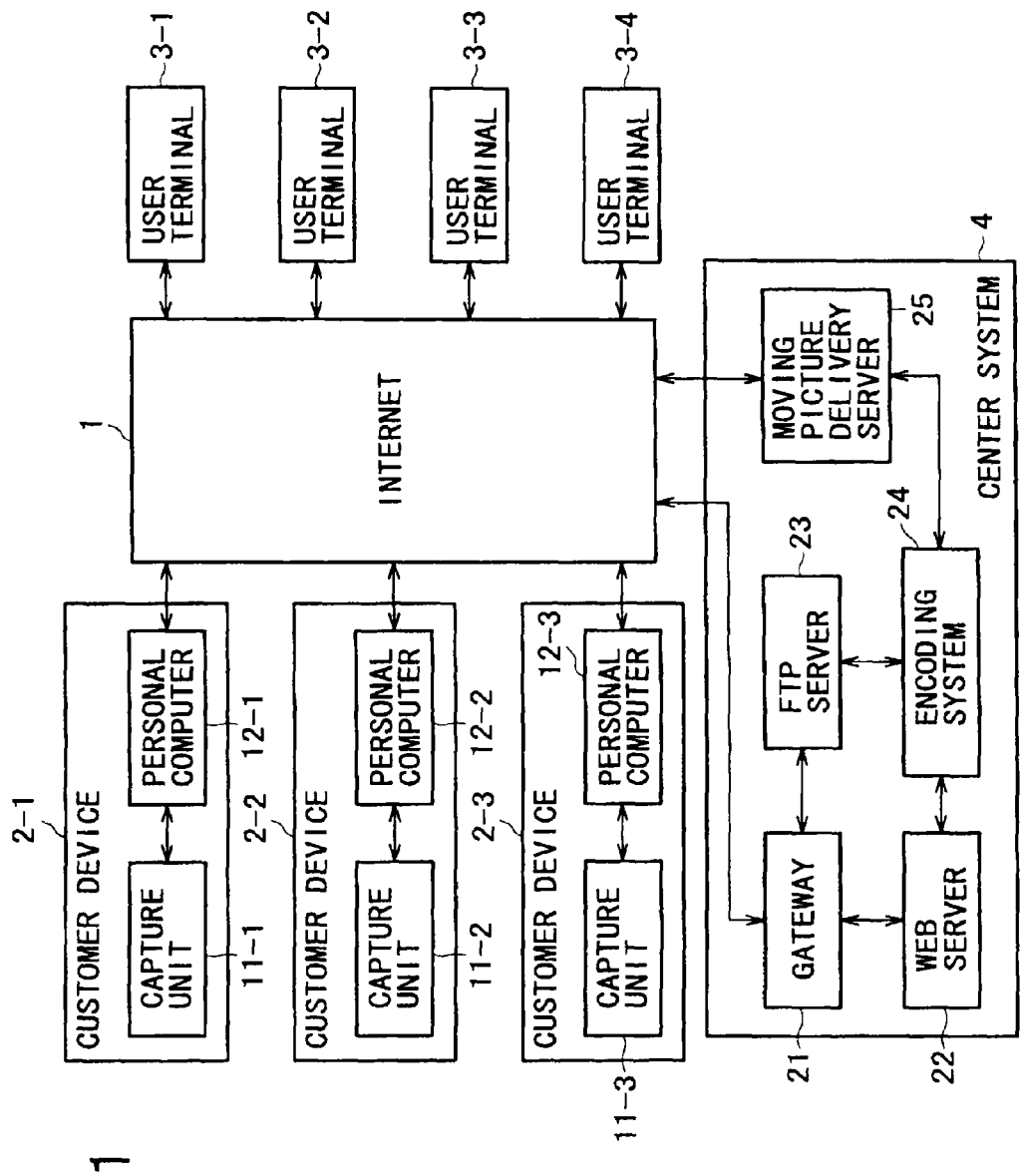
FIG. 1 is a block diagram showing a typical configuration of an information delivery system embodying this invention.

FIG. 1 shows a typical configuration of an information delivery system embodying this invention. In this system, a plurality (three in this example) of customer devices 2-1 through 2-3, a plurality (four in this example) of user terminals 3-1 through 3-4, and a center system 4 are connected to the Internet 1 utilized as a network.

The customer devices 2-1 through 2-3 include capture units 11-1 through 11-3 and personal computers 12-1 through 12-3 on a one-to-one corresponding basis.

In the description that follows, the customer devices 2-1 through 2-3 will be referred to generically as the customer device 2, the capture units 11-1 through 11-3 as the capture unit 11, and the personal computers 12-1 through 12-3 as the personal computer 12 where there is no specific need for distinction therebetween.

The capture unit 11 is illustratively constituted by a video camera or a video recorder. It supplies the personal computer 12 with AV data or the like for use as material in generating content stream data that will be delivered to the user terminals 3-1 through 3-4 (the supplied data will be called the material data hereunder).

The personal computer 12 controls the capture unit 11 and, given the material data from the capture unit 11, generates a content file by compressing the received material data using a predetermined format (MPEG2 (Moving Picture Experts Group Phase 2) for this embodiment) suitable for data transfer on the Internet 1. The content file thus generated is transmitted to the center system 4 over the Internet 1.

The material data fed from the capture unit 1 to the personal computer 12 may already have been compressed in accordance with a predetermined format (MPEG2 in this example). In such a case, the material data may be transmitted directly as a content file to the center system 4 over the Internet 1.

The material data supplied from the capture unit 1 to the personal computer 12 may have been compressed using a format different from the predetermined one above (e.g., AVI (Audio Video Interleaved) format). In that case, too, the material data may be used unchanged as a content file that is transmitted to the center system 4 over the Internet 1.

The center system 4 has a gateway 21 that controls data output and input to and from the Internet 1. A Web server 22 in the center system 4 provides relevant information to the customer device 2 through the gateway 21 and over the Internet 1. The provided information includes: information about encoding of the content file, and information about Web pages necessary for preparing an order form file that describes delivery conditions of content stream data.

If a content file encoding process is interrupted by some error, or when the upload of generated content stream data to a moving picture delivery server 25 is completed, the Web server 22 sends an e-mail to the customer device 2 through the gateway 21 and over the Internet 1 notifying the customer device 2 of what has taken place. Where the content file encoding process is halted by some error, the Web server 22 also transmits e-mail of the same nature to the administrator of the center system 4.

The Web server 22 provides the customer device 2 with further information: status of progress of the content file encoding process, status of transfer of the generated content stream data to the moving picture delivery server 25, information about the Web pages indicating a history of requests from the customer device 2, and other subjects. The status and information are sent through the gateway 21 and over the Internet 1 to the customer device 2.

When the customer device 2 gains access to the center system 4 via the Internet 1, an FTP (File Transfer Protocol) server 23 receives a content file and an order form file from the customer device 2 through the gateway 21. The received files are forwarded to an encoding system 24.

The encoding system 24 supplies the Web server 22 with information about the Web pages needed by the customer device 2 in preparing an order form file. Given a content file from the customer device 2 by way of the FTP server 23, the encoding system 24 generates content stream data by encoding the received file based on the order form file corresponding to the content file, and sends the generated stream data to the moving picture delivery server 25. In turn, the moving picture delivery server 25 stores the content stream data from the encoding system 24 and delivers the stream data in a suitably timed manner to the user terminals 3-1 through 3-4 over the Internet 1. Detailed structures of the moving picture delivery server 25 will be discussed later with reference to FIGS. 4 and 5.

Figure 2:
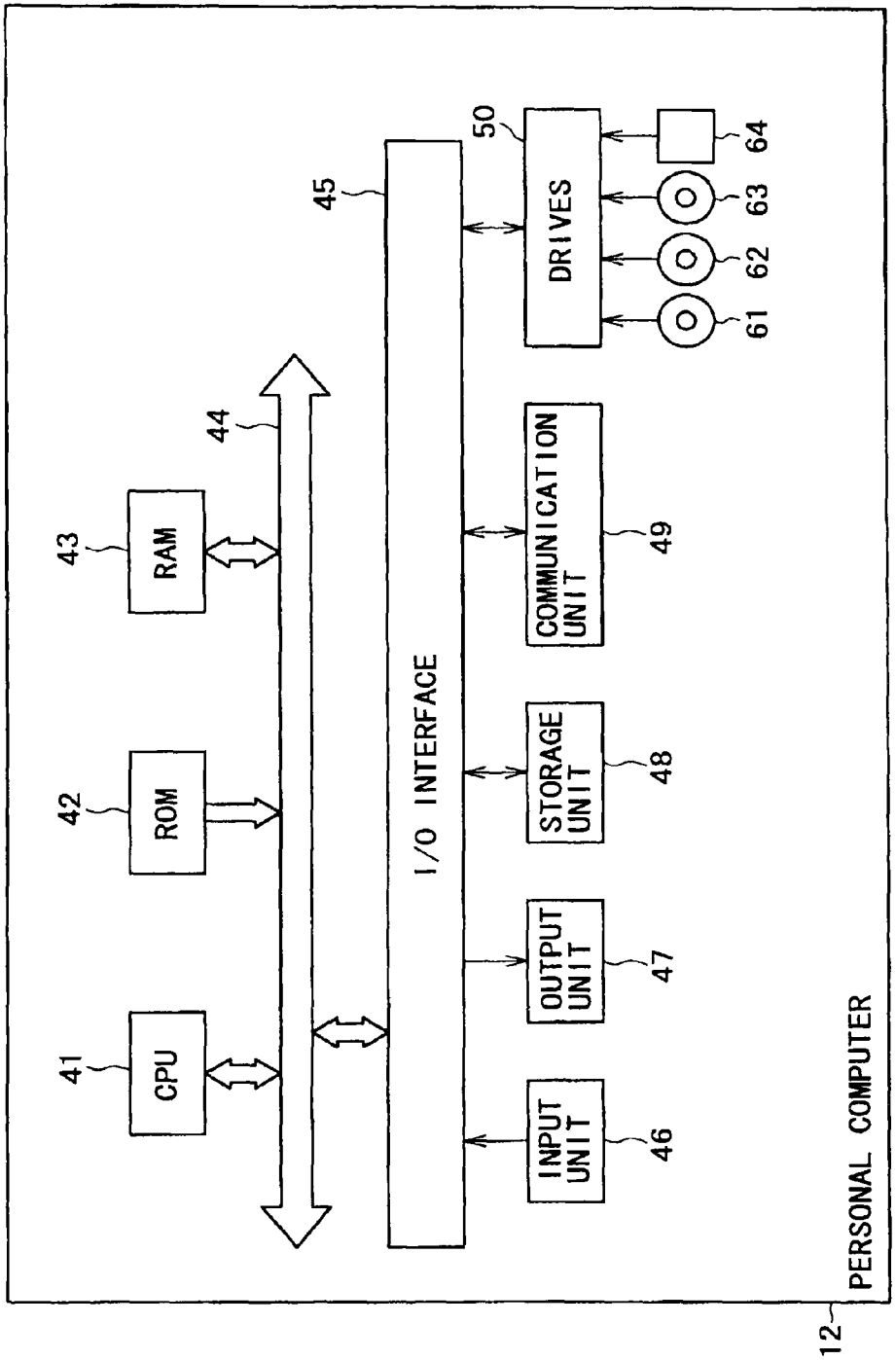
FIG. 2 is a block diagram of a personal computer in the system of FIG. 1.

FIG. 2 depicts a typical structure of the personal computer 12 included in the system of FIG. 1. In FIG. 2, a CPU (Central Processing Unit) 41 carries out various processes in accordance with programs held in a ROM (Read Only Memory) 42 or with programs loaded into a RAM (Random Access Memory) 43 from a storage unit 48. The RAM 43 also retains data needed for the CPU 41 to perform its processes.

The CPU 41, ROM 42, and RAM 43 are interconnected by a bus 44. The bus 44 is also connected to an I/O interface 45.

The I/O interface 45 is connected with the following units: an input unit 46 such as a keyboard and a mouse; a display made of a CRT (Cathode Ray Tube), an LCD (Liquid Crystal Display), or the like; an output unit 47 composed of speakers and related components; a storage unit 48 such as a hard disc drive; and a communication unit 49 constituted by a modem, a LAN (Local Area Network) adapter, and others. The communication unit 49 conducts communications over networks including the Internet 1.

The I/O interface 45 is connected with drives 50 as needed. The drives 50, when loaded with a magnetic disc 61, an optical disc 62, a magneto-optical disc 63, and/or a semiconductor memory 64, retrieve computer programs therefrom and load them into the storage unit 48 for use as needed.

The user terminals 3-1 through 3-4 are each composed of a personal computer, a PDA (Personal Digital Assistant), or a mobile telephone (including PHS). In the description that follows, the user terminals 3-1 through 3-4 will be referred to generically as the user terminal 3 where there is no specific need for distinction therebetween.

If the user terminal 3 is made of a personal computer, then the structure of the terminal is basically the same as that shown in FIG. 2.

Figure 3:
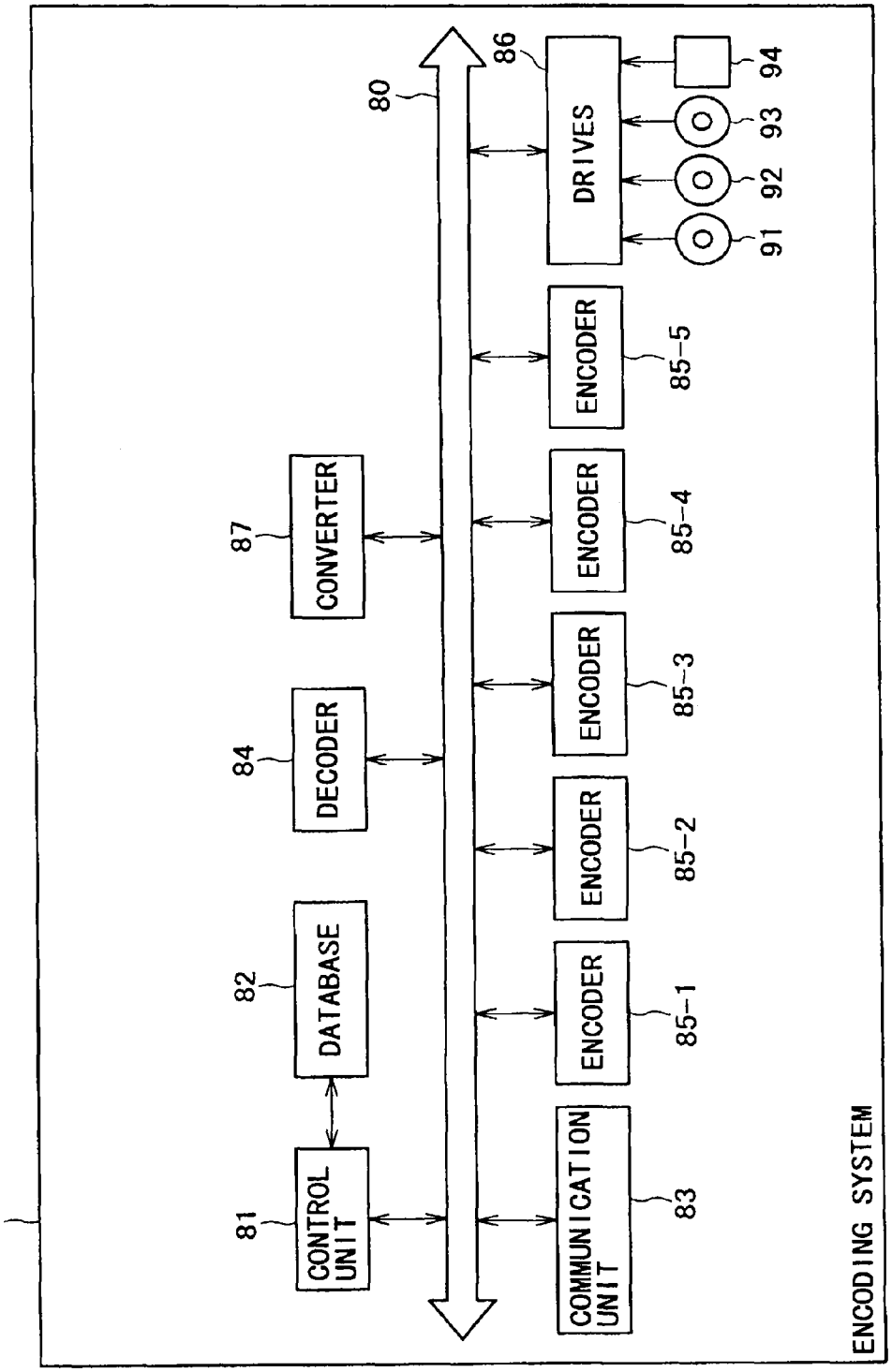
FIG. 3 is a block diagram of an encoding system in the system of FIG. 1.

FIG. 3 shows a typical structure of the encoding system 24. The encoding system 24 includes a control unit 81 composed illustratively of a microcomputer. The control unit 81 controls the overall performance of the encoding system 24. A database 82 connected to the control unit 81 holds content files fed from the FTP server 23 and order form files associated with the content files. A communication unit 83, connected to the control unit 81 via a bus 80, conducts communications with the FTP server 23, Web server 22, and moving picture delivery server 25.

A decoder 84 decompresses (i.e., decodes) using a predetermined format (MPEG2 with this embodiment) the content file supplied in compressed form from the customer device 2, whereby the original material data are restored.

The encoding system 24 has a plurality (five in this example) of encoders 85-1 through 85-5. Each of the encoders 85-1 through 85-5 encodes the restored material data in any of a variety of formats suitable for data delivery over the Internet 1. The encoding process generates content stream data.

The variety of formats illustratively include: Real Media format, Windows Media format, Quick Time format, Packet Video format, i-motion format, and ez movie format (all registered trademarks).

The content stream data encoded in Real Media format, Windows Media format, or Quick Time format are targeted illustratively for the user terminal 3 constituted by a personal computer.

The content stream data encoded in Packet Video format or i-motion format are targeted illustratively for the user terminal 3 made of NTT DoCoMo's next-generation mobile telephone "forma." The content stream data encoded in ez movie format are targeted illustratively for the user terminal 3 composed of an au (KIID) mobile telephone.

For example, the encoder 85-1 generates the content data stream by encoding the restored material data in Real Media format; the encoder 85-2 generates the content data stream by encoding the restored material data in Windows Media format; the encoder 85-3 generates the content data stream by encoding the restored material data in Quick Time format; the encoder 85-4 generates the content data stream by encoding the restored material data in Packet Video format; and the encoder 85-5 generates the content stream data by encoding the restored material data in ez movie format.

The number of encoders 85 may be increased as needed to have the restored material data encoded in a growing number of formats. This makes it possible to generate the content stream data in as many formats as desired.

Drives 86 are loaded with a magnetic disc 91, an optical disc 92, a magneto-optical disc 93, and/or a semiconductor memory 94, retrieve computer programs and data from the loaded medium, and supply them to the control unit 81 for use as needed.

Where a compressed content file coming from the customer device 2 is found to have been previously compressed by a format (e.g., AVI) other than the predetermined one (MPEG2 in this example), a converter 87 converts the content file to the format of the predetermined format (MPEG2). This conversion process will be called the pre-process hereunder. Alternatively, the content file compressed by some other format may be decompressed according to the format in question instead of being converted to the predetermined format. The alternative step also provides the restored material data.

Figure 4:
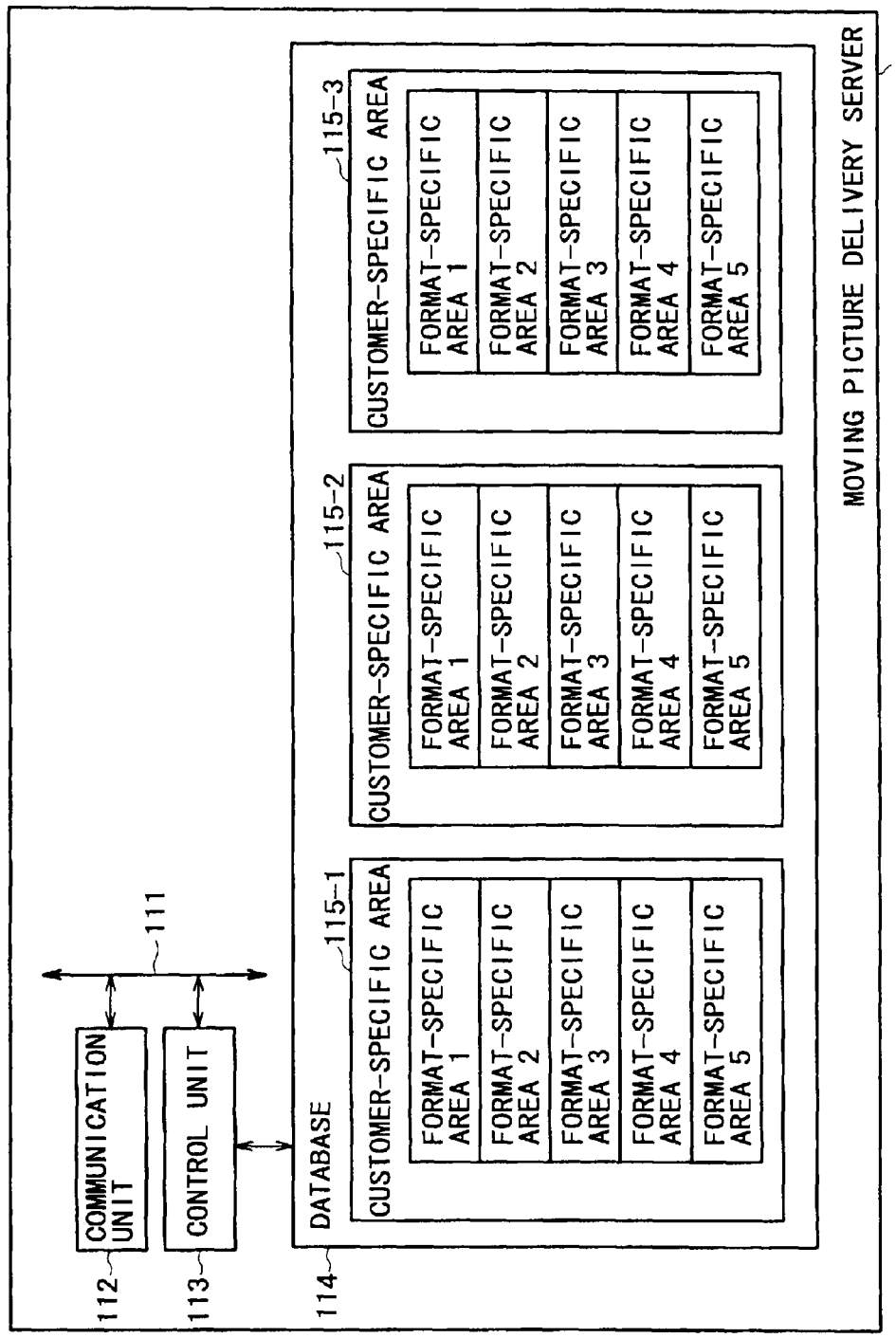
FIG. 4 is a block diagram depicting a first typical structure of a moving picture delivery server in the system of FIG. 1.

FIG. 4 depicts a first typical structure of the moving picture delivery server 25. In the first structure example, a communication unit 112 and a control unit 113 are connected by means of a bus 111. The communication unit 112 conducts communications over the Internet 1. A control unit 113 is constituted illustratively by a microcomputer and controls various processes carried out by the moving picture delivery server 25. A database 114 connected to the controller 113 has customer-specific areas 115-1 through 115-3 that hold the content stream data generated on the basis of the content files sent from the customer devices 2-1 through 2-3.

Where there is no specific need to distinguish the customer-specific areas 115-1 through 115-3 from one another, they will be referred to generically as the customer-specific area 115 hereunder.

The customer-specific area 115 includes format-specific areas 1 through 5. Each of the format-specific areas retains content stream data generated in accordance with a different order form file.

For example, the format-specific area 1 holds the content stream data encoded in Real Media format; the format-specific area 2 holds the content stream data encoded in Windows Media format; format-specific area 3 holds the content stream data encoded in Quick Time format; format-specific area 4 holds the content stream data encoded in Packet Video format; and the format-specific area 5 holds the content stream data encoded in ez movie format.

Where the number of encoders 85 in the encoding system 24 is increased so as to deal with a growing number of formats in which to generate content stream data, the number of format-specific areas is to be raised correspondingly to accommodate the content stream data in the additional formats.

Figure 5:
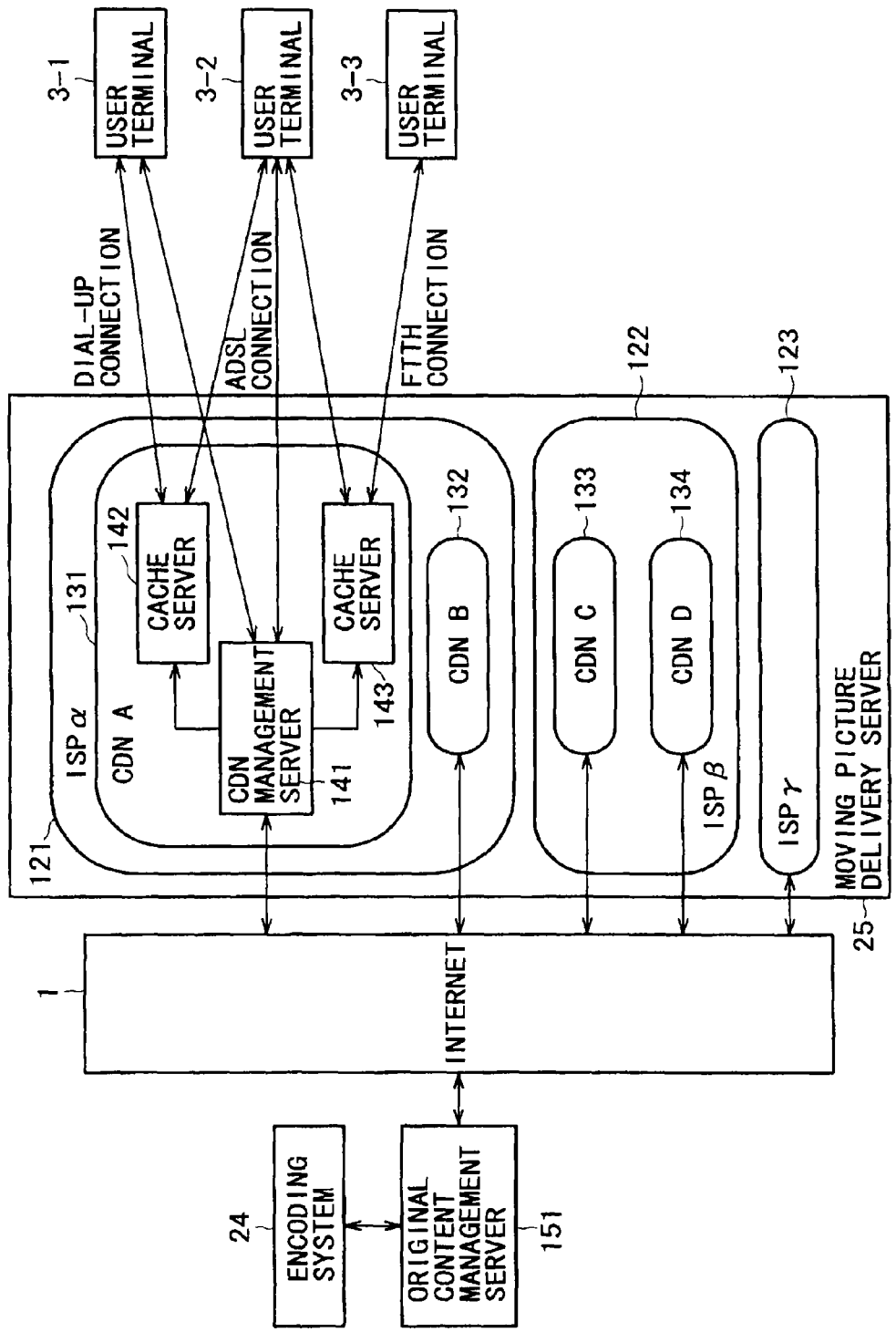
FIG. 5 is a block diagram illustrating a second typical structure of the moving picture delivery server in the system of FIG. 1.

FIG. 5 illustrates a second typical structure of the moving picture delivery server 25. In the second structure example, the moving picture delivery server 25 is made up of a plurality of servers managed by a plurality of Internet Service Providers (ISP). The moving picture delivery server 25 is connected via the Internet 1 to an original content management server 151 that manages content stream data transferred from the encoding system 24.

Illustratively, an Internet service provider a manages Content Delivery Networks (CDN) A and B. The content delivery network A is made up of a CDN management server 141 and a plurality (two in this example) of cache servers 142 and 143. The CDN management server 141 stores the content stream data sent from the original content management server 151. The cache servers 142 and 143 hold copies of the content stream data.

The CDN management server 141 and the cache servers 142 and 143 each have basically the same structure as the first structure example of the moving picture delivery server 25. Content delivery networks B, C, and D are each structured in the same manner as the content delivery network A.

The content delivery networks A through D are distinguished from one another according to such factors as the service areas of the Internet service providers, the type of the user terminal 3 connected (e.g., personal computer, mobile telephone, etc.), and the telephone company if the user terminal 3 is a mobile telephone.

The moving picture delivery server 25 is capable of identifying a different connection type of the user terminal 3 as it is connected with the CDN management server 141 and the cache servers 142 and 143. Typical connection types include dial-up narrowband connections using a modem or a terminal adapter, and broadband connections such as ADSL (Asymmetric Digital Subscriber Line) and FTTH (Fiber To The Home).

The original content server 151 transmits content stream data and delivery conditions to the CDN management server 141 covering any one of the content delivery networks A through D, which is applicable to the delivery conditions designated by the customer.

For example, if the delivery conditions include an item designating a specific service area, then the original content management server 151 transmits the content stream data and the delivery conditions only to the CDN management server 141 covering the content delivery network serving the area specified by the delivery contentions.

The CDN management server 141 places content stream data in keeping with the areas and connection types handled by the cache servers 142 and 143 lower in the hierarchy of the moving picture delivery server 25.

Where the content stream data have delivery conditions with a specific delivery period and time designated therein, the data are delivered to the user terminal 3 upon request only at the date and time corresponding to the delivery conditions.

The CDN server 141, upon receipt of a content stream data delivery request from the user terminal 3, guides the terminal 3 during the latter's access attempt toward the cache server (142, 143) that meets the delivery conditions such as a delivery period and time. The process of guiding the user terminal 3 toward the cache server may be taken over by an externally established undistributing server.

Figure 6:
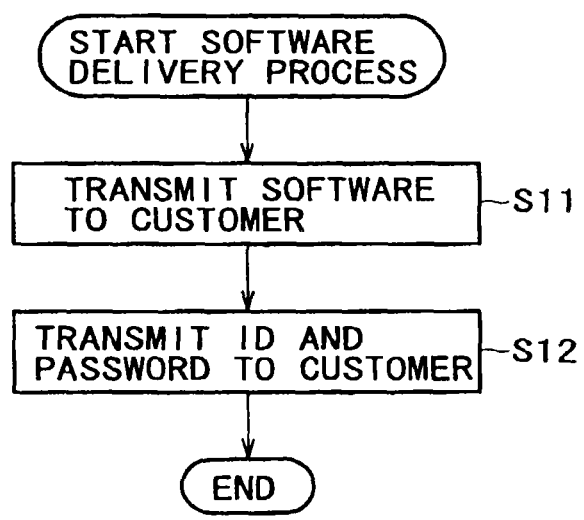
FIG. 6 is a flowchart of steps constituting a software delivery process performed by the information delivery system of FIG. 1.

In this information delivery system, the center system 4 delivers software for use by each personal computer 12 to the customer device 2 over the Internet 1. FIG. 6 is a flowchart of steps constituting a software delivery process performed by the center system 4 in delivering the software to the personal computer 12 of the customer device 2 via the Internet 1.

The software delivery process is started when the customer device 2 gains access to the center system 4 over the Internet 1 and requests delivery of relevant software therefrom.

In step S11 of FIG. 6, the center system 4 transmits the software to the customer device 2. More specifically, the control unit 81 of the encoding system 24 retrieves from the database 82 the software needed by the personal computer 12 in encoding material data into a content file and in generating an order form file including order information for encoding the content data into content stream data. The retrieved software is fed to the communication unit 83 via the bus 80. In turn, the communication unit 83 forwards the software to the FTP server 23. The FTP server 23 transmits the software received from the encoding system 24 to the customer device 2 through the gateway 21 and over the Internet 1.

In step S12, the control unit 81 reads from the database 82 a user ID and a password assigned to the customer at the customer device 2 and causes the communication unit 83 to output the retrieved user ID and password to the FTP server 23. As in step S11 above, the FTP server 23 transmits the user ID and password to the customer device 2 through the gateway 21 and over the Internet 1.

Figure 7:
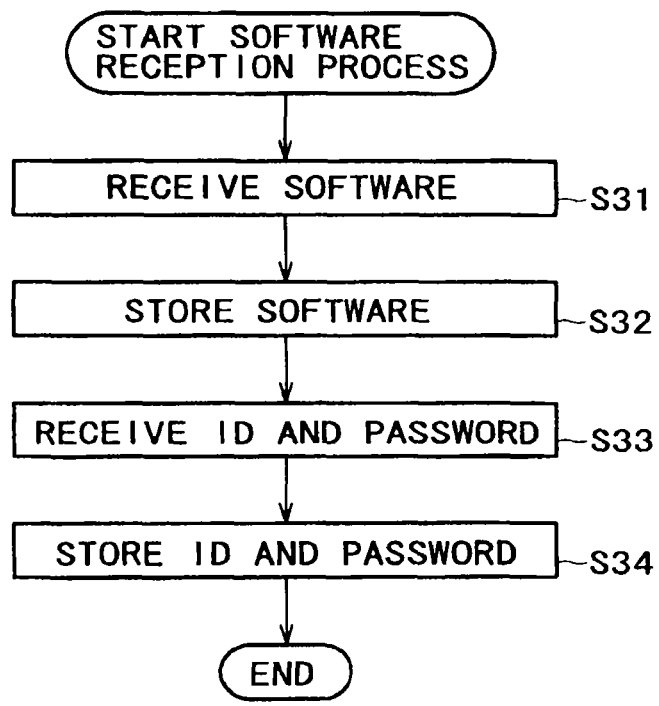
FIG. 7 is a flowchart of steps constituting a software reception process carried out by the system of FIG. 1.

In response to the software delivery process carried out as described above, the personal computer 12 of the customer device 2 performs the steps shown in the flowchart of FIG. 7.

In step S31, the CPU 41 receives the software transmitted over the Internet 1 by the center system 4 (in step S11 of FIG. 6). In step S32, the CPU 41 transfers the received software to the storage unit 48 for storage therein.

In step S33, the CPU 41 receives through the communication unit 49 the user ID and password transmitted by the center system 4 (in step S12 of FIG. 6). In step S34, the CPU 41 sends the received user ID and password to the storage unit 48 for storage therein.

With the software stored in the storage unit 48 as described, the operator of the customer device 2 may enter an order through the input unit 46 designating preparation of a content file. In that case, the CPU 41 reads suitable software necessary for the content file preparation process from the storage unit 48 and loads the retrieved software into the RAM 43. In accordance with the software loaded in the RAM 43, the CPU 41 executes the process of content file preparation shown in the flowchart of FIG. 8.

Before the content file preparation process is started, an authentication process takes place between the customer device 2 and the center system 4. The authentication process is carried out based on the user ID and password retained by the customer device 2 in step S34 of FIG. 7 as well as on the user ID and password held by the FTP server 23 or Web server 22.

Figure 8:
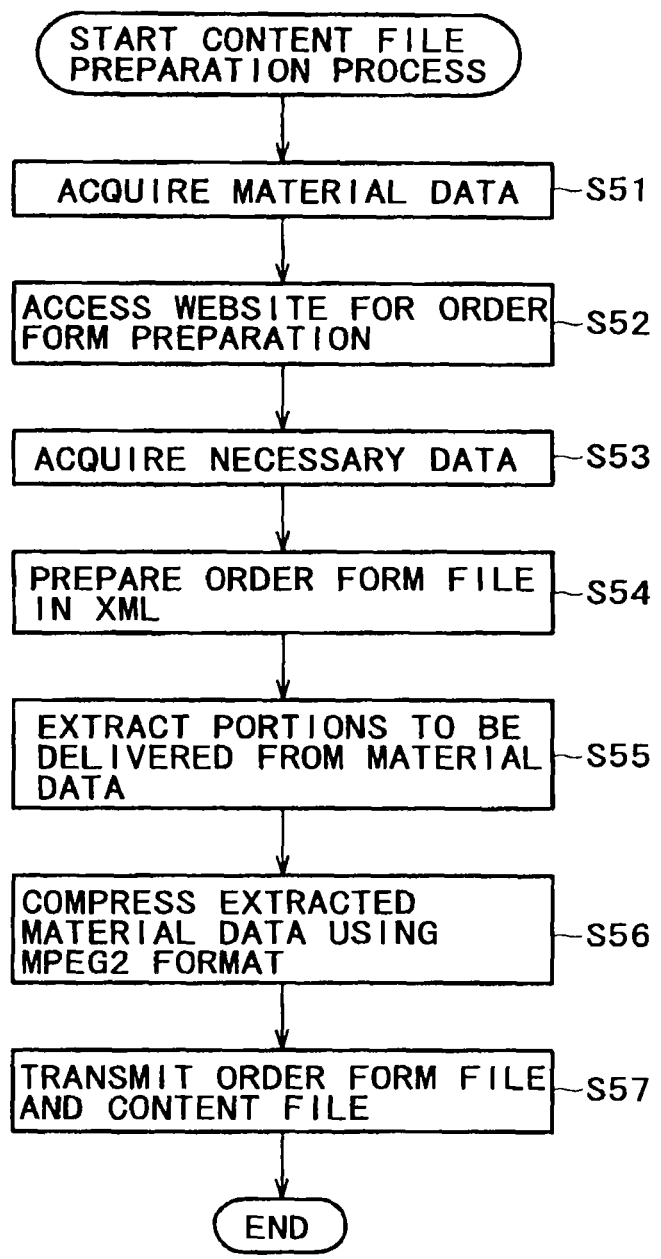
FIG. 8 is a flowchart of steps constituting a content file preparation process executed by the system of FIG. 1.

In step S51 of FIG. 8, the CPU 41 acquires material data with which to prepare the content stream data to be delivered to the user terminal 3. More specifically, the operator operates the input unit 46 to acquire the material data from the capture unit 11 (e.g., to obtain AV data from a video camera acting as the capture unit 11) and to feed the acquired data to the personal computer 12. Given the material data through the communication unit 49, the CPU 41 forwards the received data to the storage unit 48 for storage therein.

In step S52, the CPU 41 causes the communication unit 49 to access a website for order form preparation. The URL (Uniform Resource Locator) of the website is included in the software provided by the center system 4.

In step S53, the CPU 41 acquires data necessary for preparing an order form file from the order form preparation website thus accessed, and outputs the acquired data to the output unit 47 for display.

Figure 9:
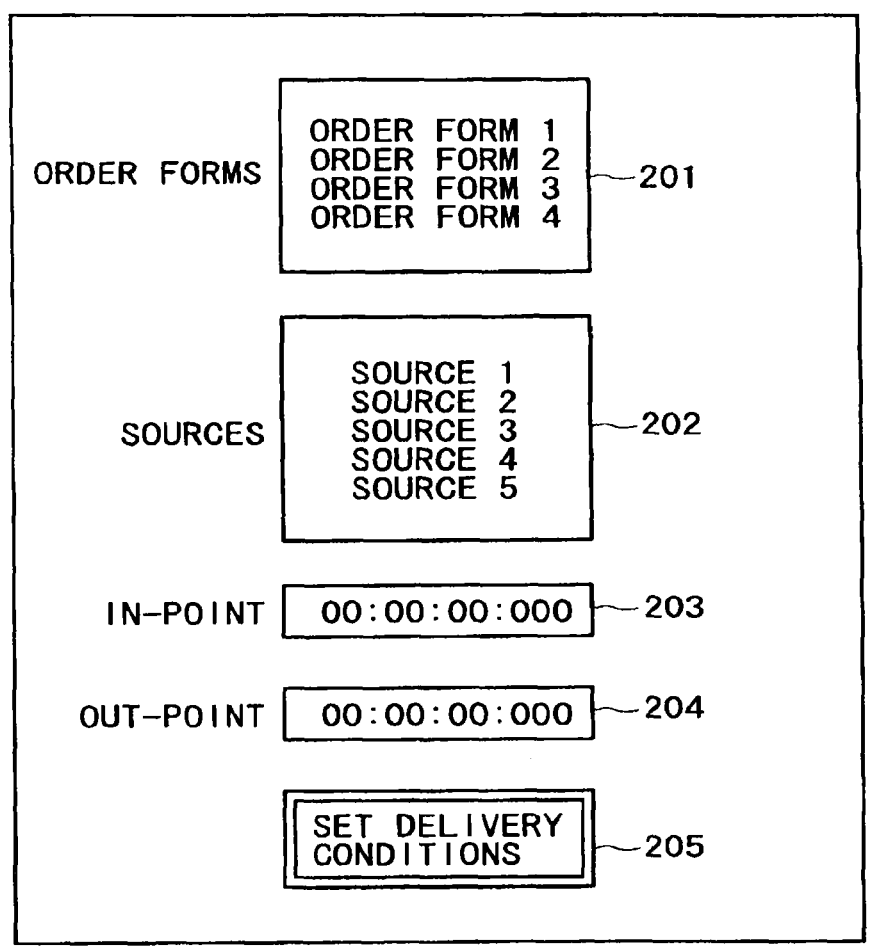
FIG. 9 is a schematic view of a typical display based on data acquired in step S53 of FIG. 7.
Figure 10:
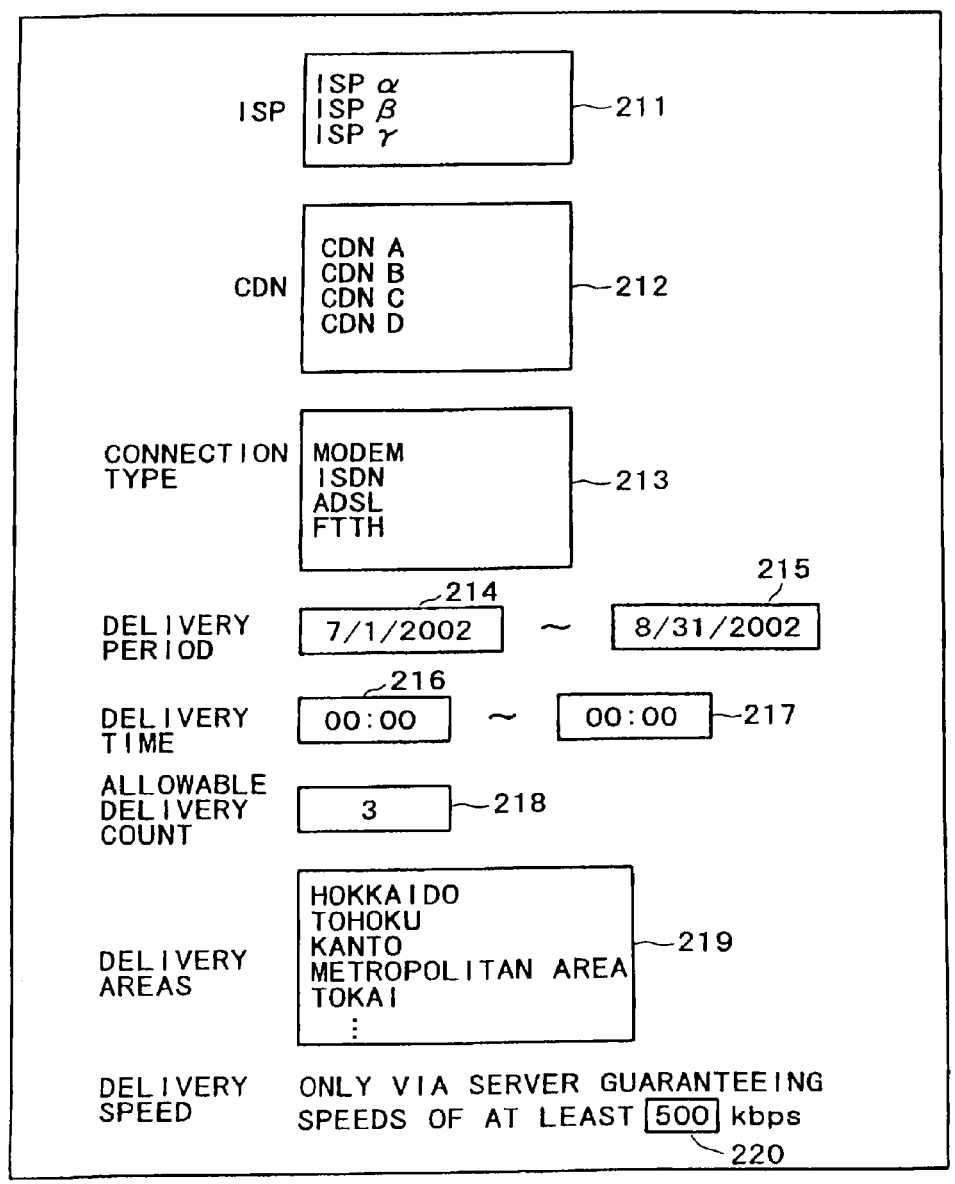
FIG. 10 is a schematic view of a typical display based on data acquired in step S53 of FIG. 7.

FIGS. 9 and 10 show examples, displayed on the output unit 47, of the data for preparing an order form file.

In the example of FIG. 9, an input field 201 indicates order form models 1 through 4 furnished in advance. The operator of the personal computer 12 may select any one of the multiple (four in this example) order form models so as to prepare an order form file with ease. Each order from file model contains default values of various parameters.

An input field 202 shows information for selecting material data with which to generate the content stream data for delivery (e.g., the information includes titles given to the material data previously stored in the personal computer 12). Sources 1 through 5 indicated illustratively in the input field 202 are titles given to the material data, which were acquired from the capture unit 11 in step S51 and which are currently stored in the storage unit 48. The operator may operate the input unit 46 to select a desired title from the input field 202, whereby the material data with which to generate the target content stream data may be readily selected.

An input field 203 permits entry of in-point information designating the starting position of a data portion targeted for delivery out of the selected material data. An input field 204 accommodates entry of out-point information specifying the ending position of the target material data portion to be delivered. The operator operates the input unit 46 to input hours, minutes, seconds, and frame numbers specifying the in-point and out-point.

A delivery condition setting button 205 is clicked on when it is desired illustratively to display a screen in which to enter the settings of an Internet service provider providing a content stream data delivery service to the user at the user terminal 3. With the delivery condition setting button 205 clicked on by the operator, a screen such as one shown in FIG. 10 appears on the display of the output unit 47 attached to the personal computer 12.

In the display example of FIG. 10, an input field 211 indicates previously registered content delivery networks α, β, and γ. The operator of the personal computer 12 may select any one of the multiple content delivery networks from the input field 211 thereby to select those servers for content stream data delivery, which apply to the selected content delivery network.

An input field 212 shows previously registered Internet service providers A through D. The operator of the personal computer 12 may select any one of the multiple Internet service providers from the input field 212 so as to select those servers for content stream data delivery, which apply to the selected Internet service provider.

In this respect, the original server 141 and cache server 142 may be selected as the preferred servers for delivering the content stream data.

An input field 213 indicates different connection types of the user terminal 3 applicable where the terminal is connected to the Internet 1. The operator of the personal computer 12 may select any one of the multiple connection types from the input field 213 thereby to designate the manner in which the user terminal 3 is to be connected to the Internet 1.

The multiple connection types shown in the input field 213 may additionally include broadband and narrowband connections.

An input field 214 permits entry of a date on which to start the content stream data delivery service. An input field 215 accommodates entry of a date on which to end the delivery service. An input field 216 enables entry of a time at which to start the delivery service. An input field 217 admits entry of a time at which to end the delivery service. The operator may operate the input unit 46 to input desired values into the input fields 214 through 217 to specify when to implement the content stream data delivery service.

An input field 218 permits entry of a maximum allowable delivery count, i.e., the maximum number of times the same content stream data are allowed to be delivered to the same user terminal 3. The operator of the personal computer 12 may operate the input unit 46 to enter a desired maximum allowable delivery count into the input field 218, thereby designating up to how many times the same content stream data may be delivered to the same user terminal 3.

An input field 219 shows geographical areas registered in advance as the areas where content stream data may be delivered. The operator of the personal computer 12 may select any one of the multiple areas from the input field 219 so as to specify where the content stream data delivery service is to be implemented.

An input field 220 permits entry of a delivery speed at which to deliver content stream data. The operator of the personal computer 12 may input a desired delivery speed to make sure that the content stream data are fed only to the servers guaranteeing the entered delivery speed.

The operator of the personal computer 12 need not to enter settings or choices in all of the input fields 211 through 220. Only those input fields that apply to the items of interest may be addressed selectively.

Returning to FIG. 8, suppose that the operator has finished making the necessary entries in the input fields. In that case, step S54 is reached in which the CPU 41 prepares an order form file in XML (Extensive Markup Language) reflecting the settings entered by the operator (i.e., an XML file is prepared).

In step S55, the CPU 41 extracts a data portion (range) identified by the in-point and out-point designated in the input fields 203 and 204, from the material data selected in the input field 202 of FIG. 9. In step S56, the CPU 41 compresses (i.e., encodes) the partial material data extracted in step S55 by use of the MPEG2 format to generate a content file. A program for compressing content data as per MPEG2 format is included in the software delivered by the center system 4 to the customer device 2. That means the customer device 2 need not be equipped with its own MPEG2 encoder.

In step S57, the CPU 41 transmits the order form file (XML file) prepared in step S54 and the content file (MPEG2 file) generated in step S56 to the center system 4 through the communication unit 49 and over the Internet 1.

Figure 11:
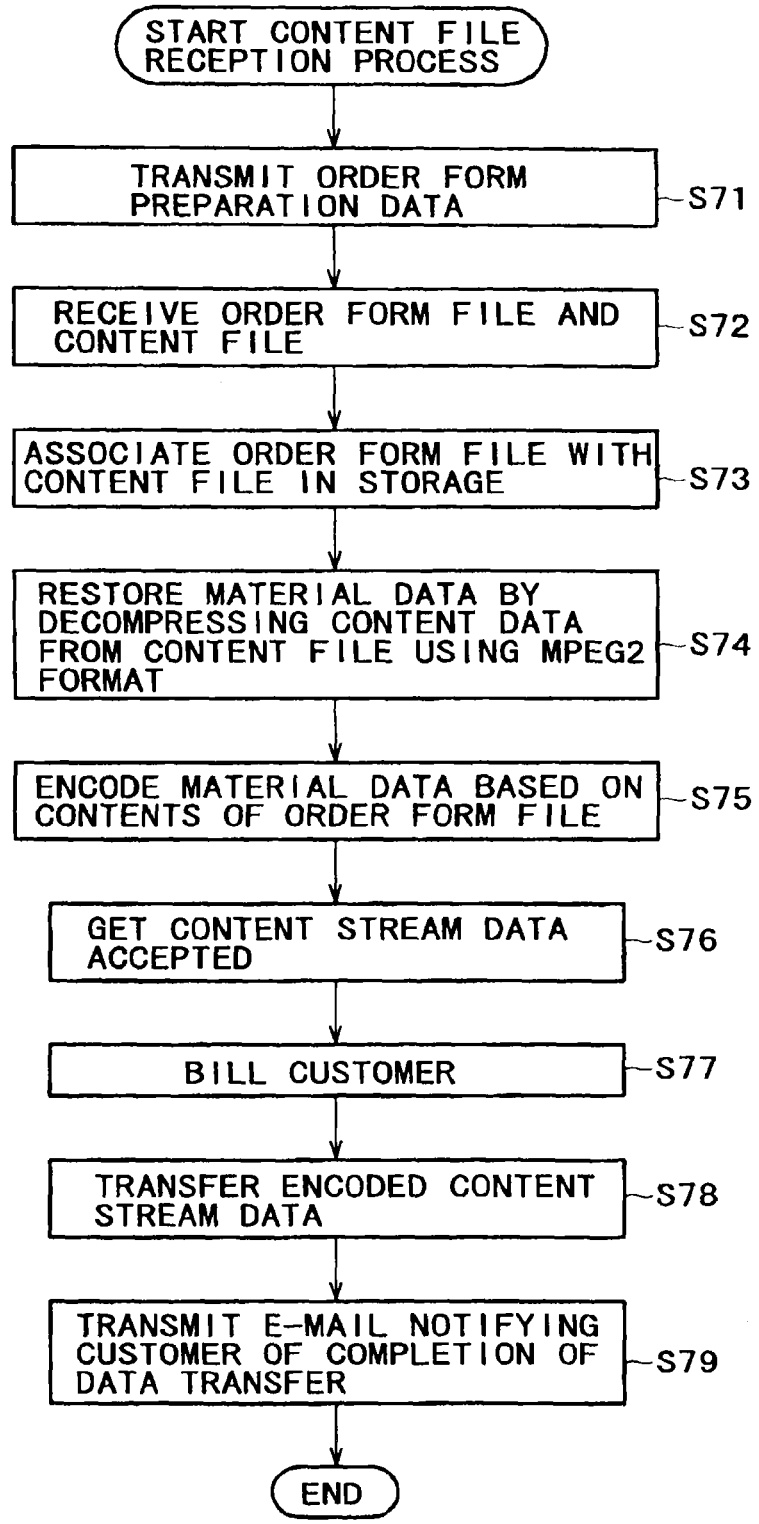
FIG. 11 is a flowchart of steps constituting a content file reception process performed by the information processing system of FIG. 1.

Described below with reference to the flowchart of FIG. 11 is a typical process of content file reception performed by the center system 4 in conjunction with the content file preparation process carried out by the customer device 1 as described above.

In step S71 of FIG. 11, the Web server 22 of the center system 4, accessed by the customer device 2 in step S52 of FIG. 8, reads data for order form file preparation from storage and transmits the retrieved data to the accessing customer device 2 through the gateway 21 and over the Internet 1.

Given the data for order form preparation, the personal computer 12 of the customer device 2 generates the order form file in the manner described above and sends the generated order form file to the center system 4 together with the content file.

In step S72, the FTP server 23 receives the order form file and content file from the customer device 2 through the gateway 21 and over the Internet 1, and forwards the received files to the encoding system 24. In step S73, the control unit 81 of the encoding system 24 receives the order form file and content file through the communication unit 83 following transmission by the customer device 2, and associates the two files before sending them to the database 82 for storage.

Because the content file is compressed in MPEG2 format, the time to send the file over the Internet 1 is significantly reduced. The storage capacity taken up by such content files in the database 82 is also reduced thanks to the compressed nature of the files.

In step S74, the control unit 81 supplies the decoder 84 with the content file placed into the database 82 for storage in step S73. In turn, the decoder 84 decompresses (i.e., decodes) the content file in MPEG2 format to restore the material data. The restored material data are again recorded to the database 82.

In step S75, the control unit 81 encodes the material data restored in step S74 on the basis of what is designated in the order form file placed in the database 82 for storage in step S73, whereby content stream data are generated.

More specifically, if the order form file specifies that the material data be encoded in the format assigned to the encoder 85-1, the control unit 81 supplies the material data to the encoder 85-1 and causes the encoder in question to encode the data in accordance with the detailed parameters designated, thus generating the content stream data. Likewise, if the order file specifies that the material data be encoded in the formats assigned to the encoders 85-4 and 85-5, the control unit 81 feeds the material data to the two encoders and causes them to encode the data in keeping with the detailed parameters designated, thereby generating the content stream data.

In step S76, the content stream data thus generated are presented to and accepted by the operator of the customer device 2. Specifically, the operator reproduces the content stream data for confirmation and accepts the billing for the service rendered to the customer device 2. With the content stream data accepted by the customer device 2, step S77 is reached in which the center system 4 bills the customer device 2 for the service rendered.

How the generated content stream data are accepted and how the customer is billed will be discussed later in more detail.

In step S78, the content stream data accepted by the customer device 2 in step S76 are transferred to the moving picture delivery server 25 for storage. More specifically, the control unit 81 takes the content stream data generated by the encoders 85-1 through 85-5 and transfers the data through the communication unit 83 to the moving picture delivery server 25 for storage therein. The control unit 81 also sends the order form file containing delivery condition information to the moving picture delivery server 25 for storage.

Upon receipt of the content stream data from the encoding system 24 through the communication unit 112, the control unit 113 of the moving picture delivery server 25 forwards the received data to the database 114 for storage. As shown in FIG. 4, the database 114 includes the customer-specific areas 115-1 through 115-3 corresponding to the customer devices 2-1 through 2-3. In this makeup, the content stream data for the customer devices 2-1, 2-2, and 2-3 are placed into the customer-specific areas 115-1, 115-2, and 115-3 respectively for storage. In each customer-specific area 115, the content stream data are further classified into the format-specific areas 1 through 5 for storage depending on the designated format.

In step S79, the Web server 22 of the center system 4 transmits an e-mail through the gateway 21 to the corresponding customer device 2 over the Internet 1 notifying the operator at the customer device 2 that the content stream data have been transferred to the moving picture delivery server 25 designated in the order form file. On receiving the e-mail, the operator of the customer device 2 can readily confirm that the content stream data have indeed been transferred to the specified moving picture delivery server 25.

Figure 12:
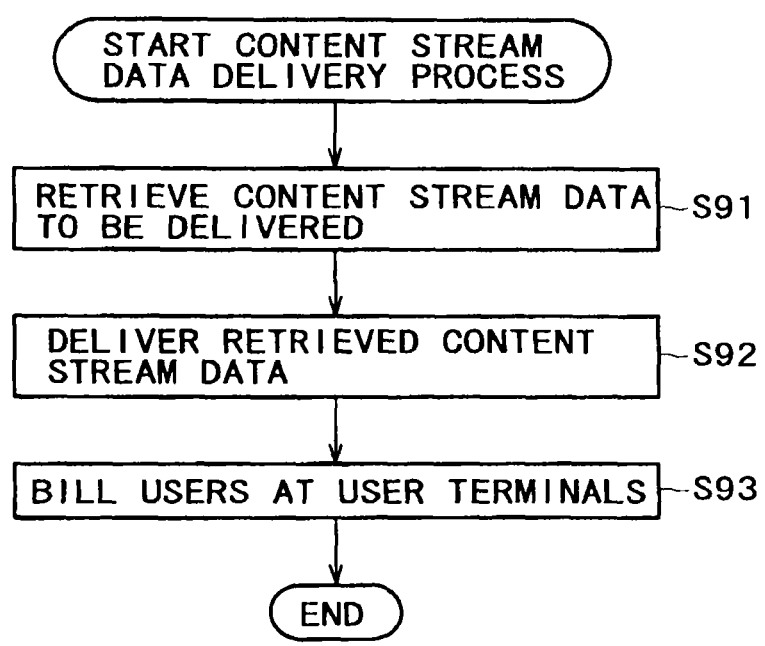
FIG. 12 is a flowchart of steps constituting a content stream data delivery process carried out by the system of FIG. 1.

When the content stream data have been stored into the moving picture delivery server 25 as described above, the server 25 carries out the steps shown in the flowchart of FIG. 12 in suitably timed fashion.

In step S91 of FIG. 12, the control unit 113 of the moving picture delivery server 25 checks to see if the current date and time coincide with the date and time designated in the delivery conditions. If the coincidence is ascertained, then the control unit 113 retrieves the content stream data from the database 114. In step S92, the control unit 113 causes the communication unit 112 to deliver the content stream data retrieved in step S91 to the user terminal 3 over the Internet 1.

In this setup, the user terminal 3 getting the content stream data may be a terminal previously registered with the center system 4 or may be a terminal that happens to have gained access to the center system 4. The user terminal 3 may alternatively be any terminal that complies with the delivery conditions in effect (e.g., located in a specific geographical area and connected in a suitable manner).

In step S93, the moving picture delivery server 25 acquires from the user terminal 3 such information as the bit rate and frame count of the content stream actually received by the terminal 3, and notifies the center system 4 of the acquired information. Given the information, the center system 4 determines accordingly the amount of the billing to the user of the user terminal 3.

For example, if the bit rate, frame count, and other pieces of information about the content stream actually received by the user terminal 3 are found to be the same as those of the delivered content stream, then the user will be charged with the full amount for the service rendered. If the information about the actually received content stream indicates significantly degraded reception status, then the billed amount may be reduced or the billing may be renounced outright.

What follows is a description of the Web pages showing the status of progress of the encoding process on the content file provided by the Web server 22 to the customer device 2 through the gateway 21 over the Internet 1, and a history of requests from the customer device 2.

Figure 13:
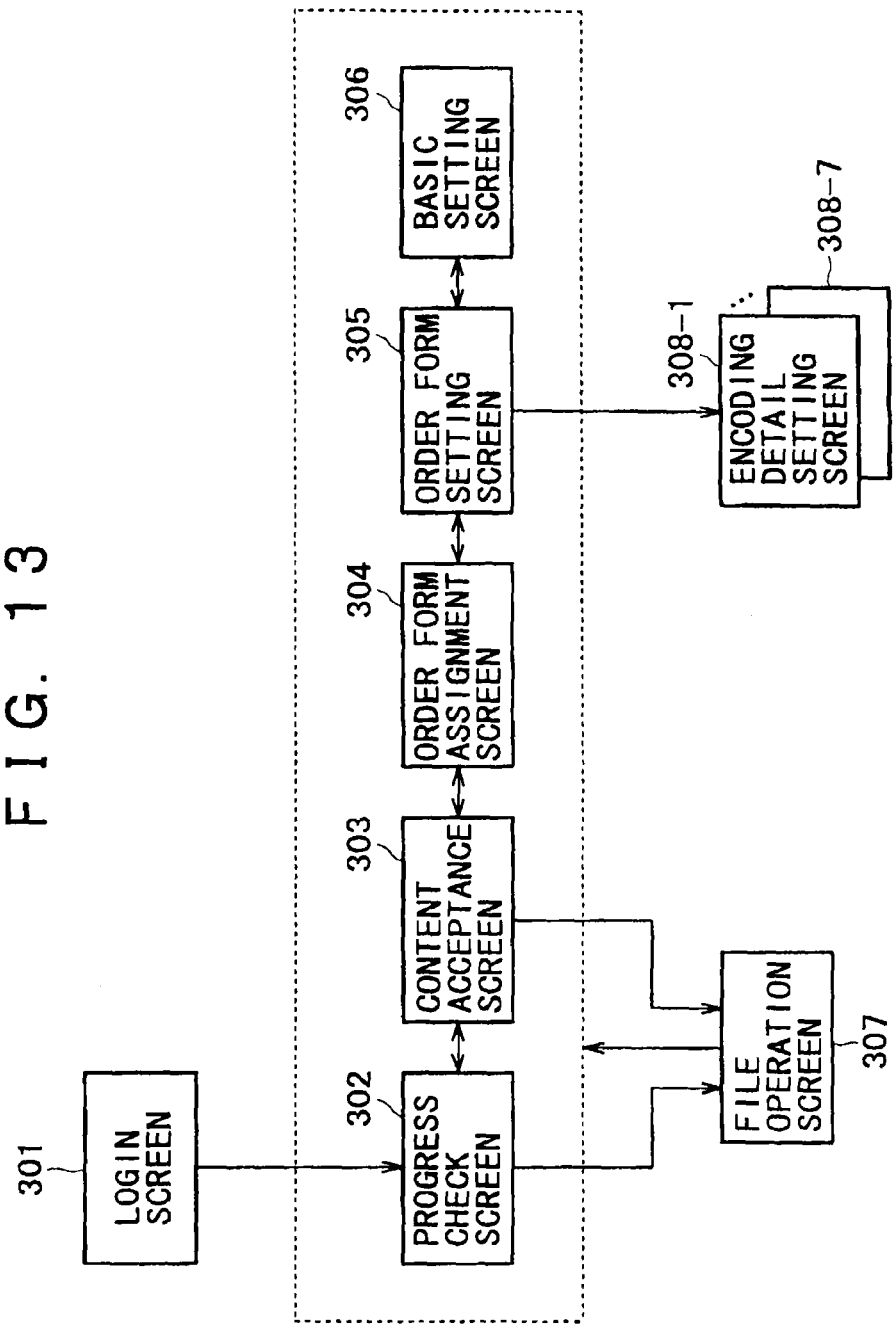
FIG. 13 is a schematic view showing typical transition of Web pages provided by a Web server in the system of FIG. 1.

FIG. 13 schematically shows typical transition of the Web pages in effect after the customer device 2 has accessed the Web server 22. Upon access to the Web server 22, a login screen 301 first appears on the customer device 2. A user ID and other data are then input onto the login screen 302 for authentication. The authentication, when completed, is followed by a progress check screen 302 permitting confirmation of the status of progress of the encoding process on a content file.

In keeping with the operator's operation, the progress check screen 302 is followed by a content acceptance screen 303 permitting acceptance of content stream data, an order form assignment screen 304 on which to establish order file assignments, an order form setting screen 305 on which to modify order file contents, or a basic setting screen 306 on which to change the password and other settings.

Transition can be effected as needed between all screens ranging from the progress check screen 302 to the basic setting screen 306.

The progress check screen 302 or content acceptance screen 303 may be followed by a file operation screen 307 through which generated content stream data are uploaded to a desired server. Control may be passed for transition from the file operation screen 307 to any one of the screens ranging from the progress check screen 302 to the basic setting screen 306.

The order form setting screen 305 may be followed by any one of encoding detail setting screens 308-1 through 308-7 on which to set detailed parameters to be included in the order form file regarding the encoding of a content file. Control may be passed for transition from any one of the encoding detail setting screens 308-1 through 308-7 to the order form setting screen 305.

Figure 14:
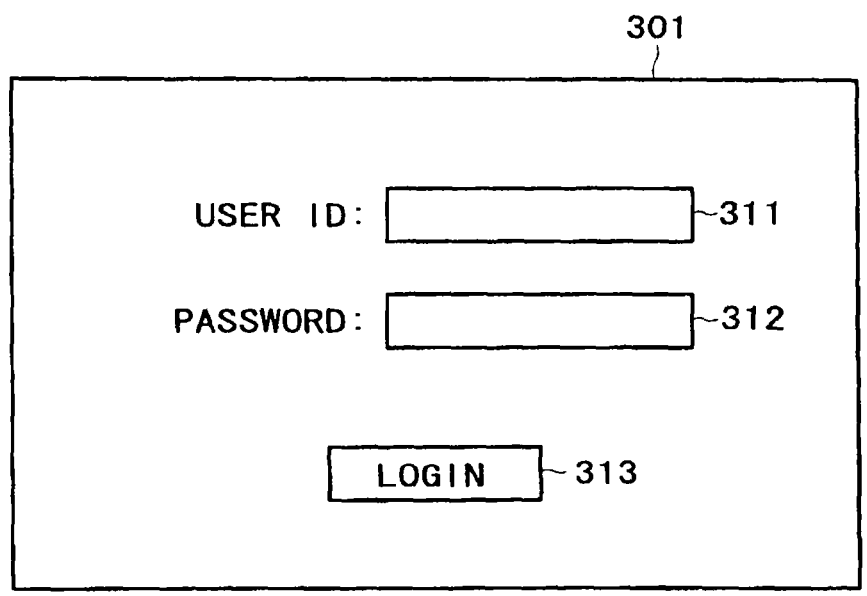
FIG. 14 is a schematic view depicting a typical display of a login screen included in FIG. 13.

FIG. 14 shows a typical display of the login screen 301. The login screen 301 includes an input field 311 for entry of a user ID, an input field 312 for entry of a password, and a login button 313 that is operated upon login.

FIG. 15 depicts a typical display of the progress check screen 302. The progress check screen 302 includes: a "check progress" button 321 that may be operated for transition to the progress check screen 302; an "accept content" button 322 operable for transition to the content acceptance screen 303; an "assign order forms" button 323 operable for transition to the order form assignment screen 304; a "set order forms" button 324 operable for transition to the order form setting screen 305; a "basic settings" button 325 operable for transition to the basic setting screen 306; a "help" button 326 operable for transition to a help screen; and a "logout" button 327 operable for logout.

It should be noted that the "check progress" button 321 appears inoperable on the progress check screen 302.

The operator of the customer device 2 may operate any one of the buttons from the "accept content" button 322 to the "basic settings" button 325 for transition to the desired screen.

The progress check screen 302 includes: a "processing" item showing buttons that may be operated each to designate subsequent processing on a given content file; an "acceptance" item indicating whether or not each content file is accepted; a "starting date and time" item showing the date and time at which each content file was transferred to the center system 4; an "ending date and time" item showing the date and time at which content stream data were generated following the encoding of each content file; a "content file name" item indicating content file names; a "format" item indicating the formats of various encoding processes; a "content stream data name" item indicating the names of generated content stream data; a "set name" item showing the names of detailed settings for each encoding process; and a "time" item indicating the reproduction times of generated content stream data.

For a content file on which the encoding process has yet to be complete, the "processing" item displays a "cancel" button 341 that may be operated to cancel the process. While the encoding process is underway on a given content file, the "ending date and time" item gives a progress status display regarding the file in question.

When the encoding process is complete on a given content file but the generated content stream data have yet to be accepted, the "processing" item displays an "accept" button 342 operable for transition to the content acceptance screen 303 and the "acceptance" item displays an indication "not yet."

When the encoding process on a given content file is complete and the generated content stream data have been accepted, the "processing" item corresponding to the file in question displays an "operate file" button 343. Activating the "operate file" button 343 brings about transition to the file operation screen 307.

On the progress check screen 302, the operator of the customer device 2 may look at the indications under the "ending date and time" item to check the progress status of encoding processes. Operating the "accept" button 342 executes transition to the content acceptance screen 303, and activating the "operate file" button 343 brings about transition to the file operation screen 307.

FIG. 16 shows a typical display of the content acceptance screen 303. As illustrated, the content acceptance screen 303 also includes the buttons ranging from the "check progress" button 321 to the "logout" button 327 described above. It should be noted that the "accept content" button 322 appears inoperable on the content acceptance screen 303.

The content acceptance screen 303 includes: a "selection" item displaying check boxes 351 that may be checked each to select the content stream data yet to be accepted; a "reproduce for check" item indicating "reproduce" buttons 353 operable each for reproducing content stream data for confirmation; a "starting date and time" item showing the date and time at which each content file was transferred to the center system 4; an "ending date and time" item showing the date and time at which content stream data were generated following the encoding of each content file; a "content file name" item indicating content file names; a "format" item indicating the formats of various encoding processes; a "content stream data name" item indicating the names of generated content stream data; a "set name" item showing the names of detailed settings for each encoding process; a "time" item indicating the reproduction times of generated content stream data; and a "size" item showing the data sizes of content stream data.

Furthermore, the content acceptance screen 303 includes another three buttons: a "select all" button 352 that may be operated to check all the check boxes 351 displayed under the "selection" item regarding all content stream data; an "accept" button 354 operated to designate the acceptance of the content stream data selected by checking any of the check boxes 351; and a "delete" button 356 operated not to accept but to delete the content stream data selected by checking any of the check boxes 351.

Operating the "accept" button 354 causes the content acceptance screen 303 to display a dialog window 361 in an overlaid manner as shown in FIG. 17, so that the execution of the acceptance step may be verified. The dialog window 361 has two buttons: an "OK" button 362 operated to confirm the total reproduction time of the content stream data to be accepted, the billed amount resulting from acceptance of the content stream data, and the acceptance of the service rendered; and a "cancel" button 363 operable for canceling the acceptance.

The billed amount submitted to the customer device 2 is determined on the basis of the time it takes to reproduce the generated content stream data. The amount may be increased if the encoding of the data has been completed in a shorter time than normal, or may be reduced if the encoding lasted longer than normal.

The content stream data are accepted on the content acceptance screen 303 as follows: the operator of the customer device 2 checks the check box 351 corresponding to the content stream data to be accepted and operates the "accept" button 354. This causes the dialog window 361 to appear. Operating the "OK" button 362 on the dialog window 361 allows the content stream data to be accepted. In conjunction with these operations, steps S76 and S77 of FIG. 11 discussed above are carried out.

FIG. 18 shows a typical display of the file operation screen 307. The file operation screen 307 also has the buttons ranging from the "check progress" button 321 to the "logout" button 327.

The file operation screen 307 includes: a "selection" item displaying check boxes 371 that may be checked each to select the content stream data accepted but not uploaded yet to the moving picture delivery server 25; an "acceptance date and time" item showing the dates and times at which content stream data were accepted; a "starting date and time" item showing the date and time at which each content file was transferred to the center system 4; a "content file name" item indicating content file names; a "format" item indicating the formats of various encoding processes; a "content stream data name" item indicating the names of content stream data; a "time" item showing the reproduction times of generated content stream data; and a "size" item showing the data sizes of content stream data.

The file operation screen 307 includes another two buttons: a "select all" button 372 that may be operated to check all the check boxes 371 displayed under the "selection" item regarding all content stream data; and an "FTP upload" button 373 operated to upload to the moving picture delivery server 25 the content stream data selected by checking any of the check boxes 371. Furthermore, the file operation screen 307 displays detailed information about the moving picture delivery server 25, i.e., the upload destinations.

Using the file operation screen 307, the operator of the customer device 2 may upload accepted content stream data to the moving picture delivery server 25. The operator may also change detailed settings of the upload destinations embraced by the moving picture delivery server 25.

FIG. 19 depicts a typical display of the order form assignment screen 304. The order form assignment screen 304 also includes the buttons ranging from the "check progress" button 121 to the "logout" button 327. It should be noted that the "assign order forms" button 323 appears inoperable on the order form assignment screen 304.

The order form assignment screen 304 shows in tabular form how order form files are assigned to the format-specific areas 1 through 5 in the customer-specific area 115 allocated in the database 114 of the encoding system 24.

For example, an order form file named order form 1 and an order form file named order form 3 are assigned to the format-specific areas 1 and 2, respectively. This means that the content stream data generated in accordance with the order form 1 are to be retained in the format-specific area 1 and that the content stream data generated in keeping with the order form 3 are to be held in the format-specific area 2.

The order form assignment screen 304 includes pop-up buttons 381, "change assignment" buttons 382, and "modify order form" buttons 383.

The operator of the customer device 2 may operate any one of the pop-up buttons 381 furnished alongside the order form names so as to get a plurality of order form file names displayed in pop-up fashion. When one of the multiple form file names on display is selected and the corresponding "change assignment" button 382 is operated, it is possible to change the order form file assigned to the format-specific area of interest. Operating any one of the "modify order form" buttons 383 executes transition to the order form setting screen 305 permitting modification of the order form file in question.

FIG. 20 shows a typical display of the order form setting screen 305. The order form setting screen 305 also includes the buttons ranging from the "check progress" button 321 to the "logout" button 327. It should be noted that the "set order forms" button 324 appears inoperable on the order form setting screen 305.

The order form setting screen 305 includes: a pop-up button 391 operated to get a pop-up display of the names of order form files whose contents are modified, so as to select one of the files; a "delete" button 392 operable for deleting the selected order form file; a "prepare anew" button 393 for preparing an order form file anew; an input field 394 in which to enter a comment on the selected order form file; and a "save comment" button 395 operated to save the content entered into the input field 394.

The order form setting screen 305 also has a field for displaying the name of a file containing various parameters for use in a preprocess, and a "change" button 396 operable for changing any of the parameters of the preprocess. Operating the "change" button 396 brings about transition to the encoding detail setting screen 308-1 permitting changes in the parameters of the preprocess.

The order format setting screen 305 further includes: a pop-up button 397 operated to get a pop-up display of formats so as to select one of them for encoding a content file; an "add new sub-profile" button 398 operated to add the selected format to an order form file of interest; a "change" button 399 operated to change a sub-profile containing detailed parameters for encoding in the selected format; and a "delete" button 400 operable for deleting the selected format from the order form file of interest. Operating the "change" button 399 calls up the encoding detail setting screens 308-2 through 308-7, which permit changes in the detailed parameters for encoding in the selected format.

Using the order form setting screen 305, the operator of the customer device 2 may add or delete formats to or from the order form files.

FIG. 21 shows a typical display of the basic setting screen 306. The basic setting screen 306 also includes the buttons ranging from the "check progress" button 321 to the "logout" button 327. It should be noted that the "basic settings" button 325 appears inoperable on the basic setting screen 306.

The basic setting screen 306 includes: an input field 421 in which to enter the currently used password for login; an input field 422 in which to enter a new password; an input field 423 in which to enter the new password again; and a "change" button 424 operated to settle the change to the newly entered password in the input fields 422 and 23. On the order form setting screen 305, the operator of the customer device 2 can change the password for login by making necessary entries into the input fields 421 through 423 and operating the "change" button 424.

The basic setting screen 306 further displays: the currently registered mail address at which to receive e-mails such as those indicating that the upload of content stream data is complete; an input field 422 in which to enter a new mail address; and a "change" button 426 operated to settle the change to the mail address entered into the input field 425. Using the order form setting screen 305, the operator of the customer device 2 may change the e-mail address by making necessary entries into the input field 425 and operating the "change" button 426. Then e-mails such as those indicating the completion of content stream data upload are received at the newly established address.

The basic setting screen 306 further displays those destinations defined by format in the moving picture delivery server 25 to which generated content stream data are uploaded. The operator of the customer device 2 may change any of the upload destinations for the generated content stream data in the moving picture delivery server 25 by overwriting the existing indications as desired.

FIG. 22 depicts a typical display of the encoding detail setting screen 308-1 that is called up when the "change" button 396 is operated on the order form setting screen 305. The encoding detail setting screen 308-1 displays the parameters for use in the preprocess. The operator of the customer device 2 may change any of the preprocess parameters by overwriting the existing indications as desired.

FIG. 23 shows a typical display of the encoding detail setting screen 308-2 that is called up when the "change" 399 button is operated on the order form setting screen 305 with the Windows Media format (WM) selected as the sub-profile format. The encoding detail setting screen 308-2 displays the parameters for encoding in Windows Media format. The operator of the customer device 2 may change any of the encoding parameters for the Windows Media format by overwriting the existing indications as desired.

FIG. 24 indicates a typical display of the encoding detail setting screen 308-3 that is called up when the "change" button 399 is operated on the order form setting screen 305 with the Real Media format selected as the sub-profile format. The encoding detail setting screen 308-3 displays the parameters for encoding in Real Media format. The operator of the customer device 2 may change any of the encoding parameters for the Real Media format by overwriting the existing indications as desired.

FIG. 25 shows a typical display of the encoding detail setting screen 308-4 that is called up when the "change" button 399 is operated on the order form setting screen 305 with the Quick Time format selected as the sub-profile format. The encoding detail setting screen 308-4 displays the parameters for encoding in Quick Time format. The operator of the customer device 2 may change any of the encoding parameters for the Quick Time format by overwriting the existing indications as desired.

FIG. 26 depicts a typical display of the encoding detail setting screen 308-5 that is called up when the "change" button 399 is operated on the order form setting screen 305 with the Packet Video format selected as the sub-profile format. The encoding detail setting screen 308-5 displays the parameters for encoding in Packet Video format. The operator of the customer device 2 may change any of the encoding parameters for the Packet Video format by overwriting the existing indications as desired.

FIG. 27 indicates a typical display of the encoding detail setting screen 308-6 that is called up when the "change" button 399 is operated on the order form setting screen 305 with the ez movie format selected as the sub-profile format. The encoding detail setting screen 308-6 displays the parameters for encoding in ez movie format. The operator of the customer device 2 may change any of the encoding parameters for the ez movie format by overwriting the existing indications as desired.

FIG. 28 indicates a typical display of the encoding detail setting screen 308-7 that is called up when the "change" button 399 is operated on the order form setting screen 305 with the i-motion format selected as the sub-profile format. The encoding detail setting screen 308-7 displays the parameters for encoding in i-motion format. The operator of the customer device 2 may change any of the encoding parameters for the i-motion format by overwriting the existing indications as desired.

On each of the encoding detail setting screens 308-2 through 308-6 in FIGS. 23 through 28, the encoding parameters on display for the respective formats are allowed to be changed. Alternatively, conceptual terms such as "picture quality first" or "movement first" may be established selectively in place of the encoding parameters described above.

For example, if the preference for picture quality is selected, then rapidly-moving picture content data may be adjusted for a higher frame rate in the encoding process, and slowly-moving picture content data may be adjusted for a lower frame rate in the encoding process.

It is possible for the personal computer 12 in the customer device 2 to generate content stream data by encoding into various formats the material data acquired by the capture device 11. However, such a setup would require manning the customer device 2 with competent personnel and installing complicated software in the PC.

Given such requirements, it is preferred that the center system 4 be arranged to carry out the encoding process in each of the diverse formats. This arrangement minimizes the hardware, software, and human resources required of the customer device 2, whereby content stream data are delivered at an appreciably reduced cost.

Every time the customer device 2 gains access to the Web server 22, the Web server 22 provides the customer device 2 with data necessary for preparing an XML file (order form file) as described above. This makes it possible constantly to furnish the customer device 2 with up-to-date data for order form preparation.

In that setup, the owner of the customer device 2 can deliver to the user terminals 3 content stream data in the most recent formats at reduced overhead, hence at a reasonable price. Obviously, it is possible to include the data for order form preparation into the software provided by the center system 4 to the customer device 2. This, however, would require complicated procedures for updating the software.

The center system 4 acts as a surrogate of the customer device 2 in delivering content stream data to the user terminals 3 as described. The owner of the center system 4 thus makes a profit by offering the owners of multiple customer devices 2 the service of content stream data delivery on a chargeable basis.

The series of processes described above may be executed either by hardware or by software. For software-based processing to take place, programs constituting the software may be either incorporated beforehand in dedicated hardware of a computer or installed upon use over a network or from a suitable program storage medium into a general-purpose personal computer or like equipment capable of executing diverse functions.

As shown in FIG. 2 or 3, the storage medium is offered to users apart from the computer not only as a package medium constituted by the magnetic disc 61 or 91 (including floppy discs); optical disc 62 or 92 (including CD-ROM (Compact Disc-Read Only Memory) and DVD (Digital Versatile Disc)); magneto-optical disc 63 or 93 (including MD (Mini-Disc)); or semiconductor memory 64 or 94; but also in the form of the ROM 42 or hard disc units in the storage unit 48 containing the programs and incorporated beforehand in the computer body.

In this specification, the steps, which are stored on a program storage medium and which describe the programs to be executed, represent not only the processes that are carried out in the depicted sequence (i.e., on a time series basis) but also processes that are conducted parallelly or individually.

In this specification, the term "system" refers to an entire configuration made up of a plurality of component units and devices.

INDUSTRIAL APPLICABILITY

As described and according to this invention, the owner of the customer can deliver content stream data always in up-to-date formats at reduced cost. The owner of the center system can secure contracts for the surrogate service of content stream data delivery from a large number of customer device owners, thus ensuring an enhanced level of capacity utilization at the center system owner's facility and delivering content stream data at low cost. The numerous contrasts with the customer device owners will yield an appreciable profit for the center system owner.

According to the invention, the owner of the customer device is able to deliver content stream data with a minimum of manpower operating the necessary equipment on a significantly reduced scale.

Freed from the need to acquire complex hardware in the inventive setup, the owner of the customer device finds it easier and much less expensive than before to deliver content stream data to user terminals.

The invention claimed is:

1. A computer-implemented server comprising:
a communication unit transmitting instructions and an order form to a client device;
wherein the order form includes a field that includes a plurality of selectable sub-fields corresponding to a plurality of content delivery networks, wherein a selectable sub-field of the plurality of selectable sub-fields corresponds to a content delivery network of the plurality of content delivery networks;
wherein executing the instructions on the client device causes displaying, on the client device, at least the plurality of selectable sub-fields of the order form, and allowing a user of the client device to select one or more content delivery networks, from the plurality of content delivery networks, from which content data is to be delivered to customers;
a controller:
controlling the communication unit to receive the content data and a completed order form from the client device, the content data being compressed according to the instructions executed on the client device;
wherein the completed order form designates one or more selected content delivery networks, from the plurality of content delivery networks, from which the content data is to be delivered to the customers;
processing the received content data based on the completed order form and generating particular content stream data based on the processed content data; and
causing the communication unit to deliver the particular content stream data to one or more content data stream delivery servers that belong to the one or more selected content delivery networks.

2. The computer-implemented server of claim 1, wherein the order form further includes one or more of: an order form selection option, a source selection option, an in-point selection option, an out-point selection option, an Internet service provider selection option, a content delivery network selection option, a connection type selection option, a delivery period selection option, or a delivery time selection option.

3. The computer-implemented server of claim 1, wherein the particular content stream data is transmitted to a user device by streaming the particular content stream data to the user device.

4. The computer-implemented server of claim 1, wherein the particular content stream data is stored at a particular customer-specific delivery area.

5. The computer-implemented server of claim 4, wherein the communication unit bills a customer after the customer has confirmed and accepted storing the particular content stream data at the particular customer-specific delivery area.

6. The computer-implemented server of claim 1, wherein the instructions are transmitted to the client device in a computer file.

7. The computer-implemented server of claim 1, further comprising an encoder configured to encode the particular content stream data to encoded content stream data.

8. A method comprising:
transmitting, from a computer-implemented communication unit, instructions and an order form to a client device;
wherein the order form includes a field that includes a plurality of selectable sub-fields corresponding to a plurality of content delivery networks, wherein a selectable sub-field of the plurality of selectable sub-fields corresponds to a content delivery network of the plurality of content delivery networks;
wherein executing the instructions on the client device causes displaying, on the client device, at least the plurality of selectable sub-fields of the order form, and allowing a user of the client device to select one or more content delivery networks, from the plurality of content delivery networks, from which content data is to be delivered to customers;
controlling, using a controller, the communication unit to receive the content data and a completed order form from the client device, the content data being compressed according to the instructions executed on the client device;
wherein the completed order form designates one or more selected content delivery networks, from the plurality of content delivery networks, from which the content data is to be delivered to the customers;
processing the received content data based on the completed order form and generating particular content stream data based on the processed content data; and
causing the communication unit to deliver the particular content stream data to one or more data stream delivery servers that belong to the one or more selected content delivery networks.

9. The method of claim 8, wherein the order form further includes one or more of: an order form selection option, a source selection option, an in-point selection option, an out-point selection option, an Internet service provider selection option, a content delivery network selection option, a connection type selection option, a delivery period selection option, or a delivery time selection option.

10. The method of claim 8, wherein the particular content stream data is transmitted to a user device by streaming the particular content stream data to the user device.

11. The method of claim 8, wherein the particular content stream data is stored at a particular customer-specific delivery area.

12. The method of claim 11, further comprising billing a customer after the customer has confirmed and accepted storing the particular content stream data at the particular customer-specific delivery area.

13. The method of claim 8, wherein the instructions are transmitted to the client device in a computer file.

14. The method of claim 8, further comprising encoding the particular content stream data to encoded content stream data.

15. One or more non-transitory computer-readable storage media storing code instructions which, when executed by one or more hardware processors, cause the one or more hardware processors to perform:
   transmitting, from a computer-implemented communication unit, instructions and an order form to a client device;
   wherein the order form includes a field that includes a plurality of selectable sub-fields corresponding to a plurality of content delivery networks, wherein a selectable sub-field of the plurality of selectable sub-fields corresponds to a content delivery network of the plurality of content delivery networks;
   wherein executing the instructions on the client device causes displaying, on the client device, at least the plurality of selectable sub-fields of the order form, and allowing a user of the client device to select one or more content delivery networks, from the plurality of content delivery networks, from which content data is to be delivered to customers;
   controlling, using a controller, the communication unit to receive the content data and a completed order form from the client device, the content data being compressed according to the instructions executed on the client device;
   wherein the completed order form designates one or more selected content delivery networks, from the plurality of content delivery networks, from which the content data is to be delivered to customers;
   processing the received content data based on the completed order form and generating particular content stream data based on the processed content data; and
   causing the communication unit to deliver the particular content stream data to one or more data stream delivery servers that belong to the one or more selected content delivery networks.

16. The one or more non-transitory computer-readable storage media of claim 15, wherein the order form further includes one or more of: an order form selection option, a source selection option, an in-point selection option, an out-point selection option, an Internet service provider selection option, a content delivery network selection option, a connection type selection option, a delivery period selection option, or a delivery time selection option.

17. The one or more non-transitory computer-readable storage media of claim 15, wherein the particular content stream data is transmitted to a user device by streaming the particular content stream data to the user device.

18. The one or more non-transitory computer-readable storage media of claim 15, wherein the particular content stream data is stored at a particular customer-specific delivery area.

19. The one or more non-transitory computer-readable storage media of claim 18, comprising additional instruction which, when executed, cause: billing a customer after the customer has confirmed and accepted storing the particular content stream data at the particular customer-specific delivery area.

20. The one or more non-transitory computer-readable storage media of claim 15, wherein the instructions are transmitted to the client device in a computer file.

* * * * *